(12) United States Patent
Wiser et al.

(10) Patent No.: US 10,097,387 B1
(45) Date of Patent: Oct. 9, 2018

(54) TEMPERATURE-STABLE FBAR TRANSMITTER

(71) Applicant: Verily Life Sciences LLC, Mountain View, CA (US)

(72) Inventors: Robert Francis Wiser, San Francisco, CA (US); Daniel Yeager, Berkeley, CA (US); Justin Schauer, Mountain View, CA (US); Kannan Aryaperumal Sankaragomathi, Seattle, WA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/237,623

(22) Filed: Aug. 15, 2016

(51) Int. Cl.
| | |
|---|---|
| *H04L 27/00* | (2006.01) |
| *H04L 27/12* | (2006.01) |
| *H04B 1/04* | (2006.01) |
| *H04W 4/00* | (2018.01) |
| *H04W 4/80* | (2018.01) |

(52) U.S. Cl.
CPC .............. *H04L 27/125* (2013.01); *H04B 1/04* (2013.01); *H04W 4/008* (2013.01); *H04W 4/80* (2018.02)

(58) Field of Classification Search
CPC ......... H04L 27/125; H04B 1/04; H04W 4/008
USPC ............................ 375/295; 370/281; 455/208
See application file for complete search history.

(56) References Cited

U.S. PATENT DOCUMENTS

| | | | |
|---|---|---|---|
| 7,098,573 B2 | 8/2006 | Stammer | |
| 7,215,214 B1* | 5/2007 | Taheri ...................... | H03B 5/04 310/315 |
| 9,276,556 B1 | 3/2016 | Wu et al. | |
| 2003/0224747 A1* | 12/2003 | Anand .................. | H03L 7/0891 455/208 |
| 2004/0130405 A1 | 7/2004 | Mohan et al. | |

(Continued)

FOREIGN PATENT DOCUMENTS

| | | |
|---|---|---|
| EP | 2800341 A1 | 11/2014 |
| KR | 2006083761 A | 7/2006 |
| WO | 2013003753 A2 | 1/2013 |

OTHER PUBLICATIONS

Written Opinion of the International Searching Authority dated Jun. 23, 2017 issued in connection with International Application No. PCT/US2017/029164, filed on Apr. 24, 2017, 9 pages.

(Continued)

*Primary Examiner* — Chieh M Fan
*Assistant Examiner* — Fitwi Hailegiorgis
(74) *Attorney, Agent, or Firm* — McDonnell Boehnen Hulbert & Berghoff LLP

(57) ABSTRACT

The present disclosure relates to a method that includes calculating a first frequency drift associated with an oscillator at a current temperature; based on the calculation, generating a first signal indicative of temperature compensation data; generating a second signal indicative of packet data and a modulation scheme; using the first signal, the second signal, and a first predetermined signal to generate a first tuning signal; and using the first tuning signal to tune a first capacitor array coupled to the oscillator and a second tuning signal to tune a second capacitor array coupled to the oscillator such that (i) the oscillator generates a modulated RF signal indicative of the packet data and (ii) the modulated RF signal has a second frequency drift that is less than a threshold.

20 Claims, 11 Drawing Sheets

(56) References Cited

U.S. PATENT DOCUMENTS

| | | | |
|---|---|---|---|
| 2005/0245001 A1 | 11/2005 | Hyvonen et al. | |
| 2007/0296513 A1 | 12/2007 | Ruile et al. | |
| 2010/0302979 A1 | 12/2010 | Reunamaki | |
| 2010/0315138 A1* | 12/2010 | Namba | H03L 1/026 327/157 |
| 2012/0075026 A1 | 3/2012 | Ruby et al. | |
| 2012/0195239 A1* | 8/2012 | Belitzer | H03L 7/099 370/281 |
| 2012/0196534 A1 | 8/2012 | Kasslin et al. | |
| 2013/0165044 A1 | 6/2013 | Xie et al. | |
| 2013/0254574 A1 | 9/2013 | Zacchio et al. | |
| 2013/0342285 A1 | 12/2013 | Kadota et al. | |
| 2014/0055243 A1 | 2/2014 | Kerai | |
| 2014/0086125 A1 | 3/2014 | Polo et al. | |
| 2014/0254466 A1 | 9/2014 | Wurster et al. | |
| 2014/0321321 A1 | 10/2014 | Knaappila | |
| 2015/0011428 A1 | 1/2015 | Cable et al. | |
| 2015/0021721 A1 | 1/2015 | Romig et al. | |
| 2015/0087255 A1 | 3/2015 | Wentzloff et al. | |
| 2015/0188491 A1* | 7/2015 | Pancholi | H03B 5/1265 331/44 |
| 2015/0330869 A1 | 11/2015 | Ziarno | |
| 2015/0332258 A1 | 11/2015 | Kurabi et al. | |
| 2016/0021686 A1 | 1/2016 | Kang et al. | |
| 2016/0029148 A1 | 1/2016 | Jackson et al. | |
| 2016/0099701 A1 | 4/2016 | Rinaldi et al. | |
| 2016/0105760 A1 | 4/2016 | Hui Wang | |
| 2016/0105761 A1 | 4/2016 | Polo et al. | |
| 2016/0254844 A1* | 9/2016 | Hull | H04B 5/0062 340/6.1 |
| 2017/0346516 A1 | 11/2017 | Ripley et al. | |

OTHER PUBLICATIONS

International Search Report dated Jun. 23, 2017 issued in connection with International Application No. PCT/US2017/029164, filed on Apr. 24, 2017, 4 pages.

Written Opinion of the International Searching Authority dated Mar. 29, 2017 issued in connection with International Application No. PCT/US2016/066296, filed on Dec. 13, 2016, 10 pages.

International Search Report dated Mar. 29, 2017 issued in connection with International Application No. PCT/US2016/066296, filed on Dec. 13, 2016, 6 pages.

Nelson, Andrew et al. "A 22pW, 2.0GHz FBAR oscillator" IEEE Radio Frequency Integrated Circuits Symposium (2011), pp. 1-4.

Paidimarri, Arun et al. "A 2.4 GHz Multi-Channel FBAR-Based Transmitter With an Integrated Pulse-Shaping Power Amplifier" IEEE Journal of Solid-State Circuits (2013), vol. 48(4), pp. 1042-1054.

Otis, Brian Patrick "Ultra-low power wireless technologies for senor networks" Ph.D. Thesis, University of California, Berkeley(Spring, 2005), 181 pages.

Paidimarri, Arun "Architecture for ultra-low power multi-channel transmitters for body area networks using RF resonators" Massachusetts Institute of Technology (Jun. 2011), pp. 1-103.

Chee, Y.H. et al. "An ultra-low power injection locked transmitter for wireless sensor networks" IEE Custom Integrated Circuits Conference (2005), pp. 797-800.

Chee, Y.H. et al. "Ultra low power transmitters for wireless sensor networks" Electrical Engineering and Computer Sciences University of California at Berkeley (May 15, 2006), 140 pages.

Otis, B.P. et al., "An ultra-low power MEMS-based two-channel transceiver for wireless sensor networks" Department of Electrical Engineering and Computer Science University of California, Berkeley (2004), pp. 1-4.

Hu, Julie R. et al., "A 1.56 GHz Wide-Tuning All Digital FBAR-Based PLL in 0.13 um CMOS", Department of Electrical Engineering, University of Washington, Seattle, Washington (2010), pp. 1-4.

Sankaragomathi, Kannan a., "A +/− 3ppm 1.1mW FBAR Frequency Reference with 750 MHz Output and 750mV Supply" University of Washington, Seattle, 3 pages.

Thirunarayanan, Raghavasimhan, "Reducing Energy Dissipation in ULP Systems: PLL-Free FBAR-Based Fast Startup Transmitters", IEEE Transactions on Microwave Theory and Techniques, vol. 63, No. 4, Apr. 2015, pp. 1110-1117.

International Search Report dated Mar. 29, 2017 issued in connection with International Application No. PCT/US2016/066296, filed on Dec. 13, 2016, 5 pages.

IRF8001 Product Specification 1.3—Nordic Semiconductor https://www.nordicsemi.com/kor/content/download/2981/38488/file/nRF8001_PS_v1.3.pdf last accessed Apr. 23, 2017, 217 pages.

Written Opinion of the International Searching Authority dated May 19, 2017 issued in connection with International Application No. PCT/US2017/021423, filed on Mar. 8, 2017,9 pages.

International Search Report dated May 19, 2017 issued in connection with International Application No. PCT/US2017/021423, filed on Mar. 8, 2017,4 pages.

\* cited by examiner

TEMPERATURE-STABLE FBAR TRANSMITTER

BACKGROUND

Unless otherwise indicated herein, the materials described in this section are not prior art to the claims in this application and are not admitted to be prior art by inclusion in this section.

Portable computing devices, such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to audio speakers and a microphone of a motor vehicle, possibly allowing for hands-free use of the phone while operating the vehicle. Thus, numerous applications have allowed Bluetooth to grow as the standard wire-replacement protocol. In multiple applications, Bluetooth remains particularly attractive due to its low-cost solutions and protocols designed for low power consumption.

SUMMARY

In one example, a method is provided. The method includes calculating a first frequency drift associated with an oscillator at a current temperature; based on the calculation, generating a first signal indicative of temperature compensation data; generating a second signal indicative of packet data and a modulation scheme; using the first signal, the second signal, and a first predetermined signal to generate a first tuning signal; and using the first tuning signal to tune a first capacitor array coupled to the oscillator and a second tuning signal to tune a second capacitor array coupled to the oscillator such that (i) the oscillator generates a modulated RF signal indicative of the packet data and (ii) the modulated RF signal has a second frequency drift that is less than a threshold.

In another example, a broadcasting unit is provided. The broadcasting unit includes an oscillator; a first capacitor array and a second capacitor array coupled to the oscillator; a temperature sensor; a controller including a processor programmed to: calculate a first frequency drift associated with the oscillator at a current temperature; based on the calculation, generate a first signal indicative of temperature compensation data; generate a second signal indicative of packet data and a modulation scheme; use the first signal, the second signal, and a first predetermined signal to generate a first tuning signal; and use the first tuning signal to tune the first capacitor array and a second tuning signal to tune the second capacitor array such that (i) the oscillator generates a modulated RF signal indicative of the packet data and (ii) the modulated RF signal has a second frequency drift that is less than a threshold.

In yet another example, a system is provided. The system includes a sensor; a transceiver coupled to the sensor, the transceiver including: an oscillator including a thin-film bulk acoustic resonator (FBAR); a first capacitor array and a second capacitor array coupled to the oscillator; a temperature sensor; and an antenna. The system also includes a controller including a processor programmed to: calculate a first frequency drift associated with an oscillator at a current temperature; based on the calculation, generate a first signal indicative of temperature compensation data; generate a second signal indicative of packet data and a modulation scheme; use the first signal, the second signal, and a first predetermined signal to generate a first tuning signal; and use the first tuning signal to tune the first capacitor array and a second tuning signal to tune the second capacitor array such that (i) the oscillator generates a modulated RF signal indicative of the packet data and (ii) the modulated RF signal has a second frequency drift that is less than a threshold.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, some of which are contemplated herein.

Note that while the signals described herein are generally referred to as conforming to the Bluetooth core specification, one of ordinary skill in the art would understand that the signals described herein need not conform to the Bluetooth core specification. Also, while the devices disclosed herein are generally referred to as Bluetooth or Bluetooth Low Energy devices, one of ordinary skill in the art would understand that the devices disclosed herein may be used to generate, transmit, and receive signals that do not conform to the Bluetooth core specification.

The terms "advertisement packet," "advertisement channel," and "advertisement event" are disclosed herein to describe several embodiments. Note that these terms are terms of art described in the Bluetooth core specification.

I. Overview

As noted, Bluetooth continues to grow as the standard wire-replacement protocol, and remains particularly attractive due to its protocols designed for low power consumption. Specifically, Bluetooth Low Energy (BLE), an extension of Bluetooth technology, may be attractive in applications where low power consumption may be advantageous.

In particular, BLE provides protocols for low power devices to communicate with multiple other devices. For example, consider a device that can be powered by one or more batteries. Further, consider that the device may be used in an application where replacing or recharging the one or more batteries may not be easily achievable. Accordingly, the device may be a low power device to preserve the charge of its power source. As such, the device may utilize BLE's protocols for communicating with other devices, such as computing devices (e.g., phones, laptops, and wearable computing devices). In an example, the low power device, e.g., a sensor, may utilize BLE protocols to transmit data (e.g., sensor data) to a computing device.

Figure 1:
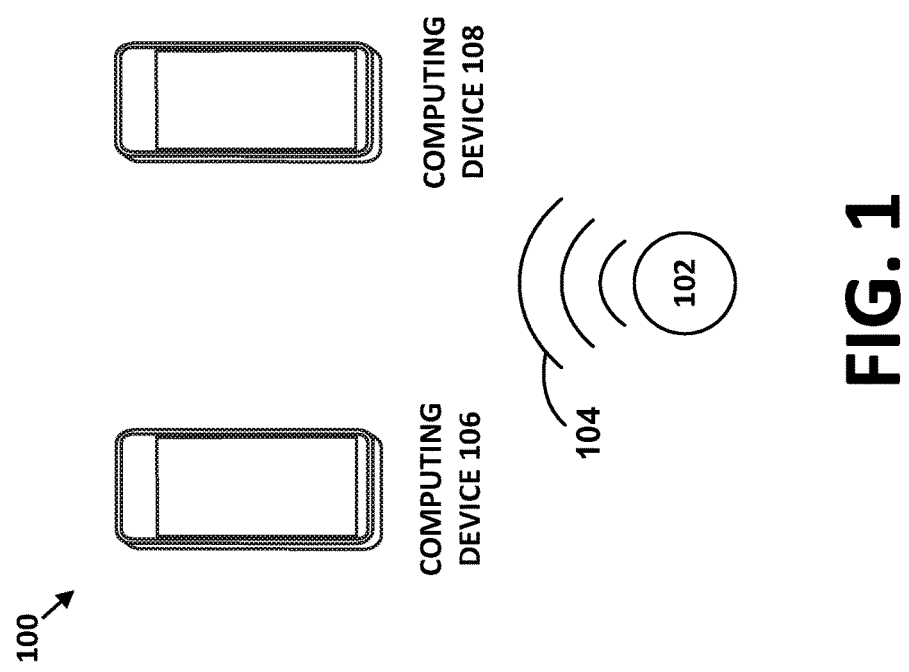
FIG. 1 illustrates computing devices located in proximity to a beacon, in accordance with an example embodiment.

FIG. 1 illustrates an example scenario 100 of a device utilizing BLE protocols. The BLE protocols may be carried out by a low power device 102 (also referred to herein as a "beacon"), which may include a sensor. More specifically, the beacon 102 may include a BLE device or module, which may transmit and/or receive a signal 104 according to BLE protocols. The power source of a BLE device may be one or more batteries. In some examples, the one or more batteries may be the one or more batteries of the beacon 102 in which the BLE device is incorporated. Further, the beacon 102 may transmit, according to BLE protocols, the signal 104 to the computing devices 106 and 108. However, it should be understood that the arrangement for the beacon 102 provided in FIG. 1 is for purposes of illustration only. For example, the beacon 102 may be included in any device, such as a phone (i.e., computing device), a digital television, a monitor, a tablet computer, wearable computing devices, and/or a human-interface device, among other possibilities. Further, in some embodiments, the beacon 102 may transmit a signal 104 to more than or fewer than two computing devices.

In scenario 100, each of the computing devices 106 and 108 may include a Bluetooth module, which may perform a Bluetooth scan to search for other Bluetooth devices and/or for signals from Bluetooth devices. In some embodiments, the computing devices 106 and 108 may scan for Bluetooth devices in order to pair with a Bluetooth device that is within a range of the Bluetooth scan of the computing devices. In other embodiments, at least one of the computing devices 106 and 108 may receive a signal from a Bluetooth device without pairing with the Bluetooth device. For example, at least one of the computing devices may receive a Bluetooth signal, e.g., signal 104, from the beacon 102 without pairing with the beacon 102.

Furthermore, scenario 100 may be a scenario where low power consumption by the beacon 102 is desirable. For example, the power source of the beacon 102 may have limited charge. In such a scenario, low power consumption by the beacon 102 may be desirable to extend the life of the power source. Generally, the power consumption of a BLE device may be governed by the configuration of the BLE device and/or the hardware of the BLE device. Accordingly, the BLE devices disclosed herein may be described in relation to at least decreasing power consumption.

The performance of the beacon 102 may be affected by external factors, such as environmental factors. For example, the performance of the beacon 102's components may vary with temperature. A change in the temperature of the beacon 102 (e.g., due to environmental factors) may affect the frequency of the signal 104. More specifically, the frequency of the signal 104 may drift from the frequency of the channel on which the beacon 102 may be operable to transmit the signal 104. The frequency of the channel on which the beacon 102 may be operable to transmit the signal 104 may also be referred to herein as a "target frequency." Similarly, the channel on which the beacon 102 may be operable to transmit the signal 104 may be referred to herein as a "target channel."

The frequency drift may cause interference issues as the frequency of the signal 104 drifts into the frequency range of other channels. Further, the computing devices 106 and 108 may be scanning the channel on which the beacon 102 may be operable to transmit the signal 104 in order to receive the signal 104. The computing device 106 and 108 may not receive the signal 104 if the frequency of the signal 104 drifts from the frequency of the channels that the computing devices 106 and 108 may be scanning.

Disclosed herein is a method of using open-loop temperature compensation to mitigate the effects that temperature may have on the performance of the beacon 102. Temperature compensation may include calculating a compensation signal that may be applied to the components of the beacon 102 such that the beacon 102 transmits the signal 104 at or within a threshold of a target frequency.

II. Example Systems and Methods

Figure 2:
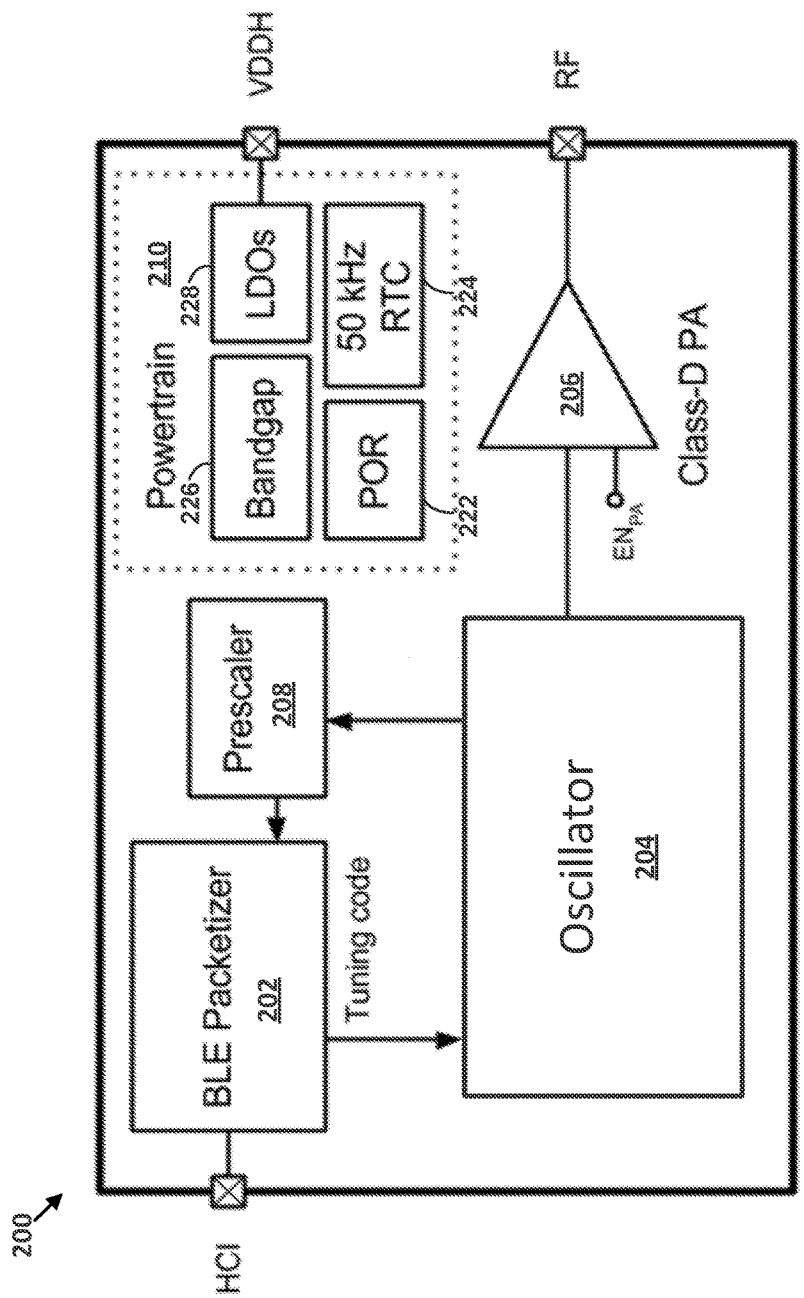
FIG. 2 is a schematic diagram of a transmitter, in accordance with an example embodiment.

FIG. 2 schematically illustrates a BLE transmitter 200, according to an example embodiment. In some embodiments, the BLE transmitter 200 may be included in other devices as a Bluetooth module. For instance, a BLE module may be included in or coupled with the beacon 102 in scenario 100. A device, such as beacon 102, that includes a BLE module may be referred to as a "host device." Accordingly, a BLE module may receive instructions from a processor and/or a memory of a host device. A controller of a BLE module may interface with the host stack of its host device via a Host Controller Interface (HCI). For example, the BLE transmitter 200 may receive a signal via the HCI, which may include data that may be transmitted by the BLE transmitter 200. In some embodiments, the host stack and the controller of a BLE module may be implemented on different processors. In other embodiments, the host stack and the controller of a BLE module may be implemented on the same processor.

As illustrated in FIG. 2, the BLE transmitter 200 may include a BLE packetizer 202, an oscillator 204, a powertrain 210, and an amplifier 206. The BLE transmitter 200 may also include an antenna (not illustrated in FIG. 2). Additionally and/or alternatively, the antenna may be part of the host device. These components, as described herein, may be used to transmit a signal 104 from the BLE transmitter 200. Accordingly, in some embodiments, a BLE module includes only BLE transmitter 200 as a communication interface. Such a BLE module may operate solely as a transmitter (also referred to herein as a "broadcaster"). For instance, in scenario 100, the beacon 102, using the BLE transmitter 200, may transmit a signal, which may be received by the computing devices 106 and 108, without pairing with or receiving a signal from the computing devices.

In other embodiments, the BLE transmitter 200 may operate as a transmitter of a transceiver BLE device. A transceiver BLE device may include components that may be used to transmit and receive a signal. For instance, the transceiver may include, along with the transmitter 200's components illustrated in FIG. 2, a low-noise amplifier (LNA), a mixer (e.g., UQ mixer), a local oscillator (LO), a variable gain amplifier, filters (e.g., baseband filter), and an analog-digital-converter (ADC). The transceiver may also include an antenna that may be used to transmit and receive signals. For instance, in scenario 100, the beacon 102, using a BLE transceiver, may transmit a signal, which may be received by the computing devices 106 and 108. The beacon 102 may also receive a signal from the computing devices 106 and 108.

Returning to FIG. 2, the BLE packetizer 202 may receive a signal via the HCI. As explained elsewhere herein, the signal may originate from a processor of a host device. Further, the received signal may include packet data that may be included in the signal transmitted by the BLE transmitter 200. The received signal may also include data indicative of a configuration of the BLE module. For example, the received signal may include parameters, such as encryption parameters, modulation parameters, a mode of operation of the BLE module, packet type, etc. The received parameters may be used to configure the BLE module to generate a signal, which may be transmitted by the antenna.

For instance, the signal received via the HCI may be indicative of a mode of operation of the BLE module. Within examples, the mode of operation may depend on the functionality of the BLE module. In some embodiments, the functionality of a BLE module may be predetermined and fixed, as the BLE module may be used in a single application. In other instances, a user may provide an input indicative of the mode of operation to the host computing device. In particular, the user may provide an input to an input/output function of the computing device, possibly a graphical user-interface (GUI), to specify the mode of operation.

In some embodiments, the modes of operation of the BLE device 200 may include an advertising mode in which a BLE advertising protocol is used to periodically transmit data packets referred to as advertising packets (also referred to herein as "advertisement packets"). Despite their name, these data packets typically have no relation to "advertisements" in the marketing sense of the word. Rather, such data packets are referred to as advertising packets because they may be used to announce various data to one or more other devices capable of receiving the announcement. The advertising packets may carry data indicative of the BLE device 200 (e.g., a unique identification number (UID)). Alternatively or additionally, advertising packets may carry data indicative of or information from a device that may include the BLE device 200 as a Bluetooth module. For example, the host device may use advertising packets to possibly "pair" or connect with another device.

In another example, a BLE module may use advertising packets to advertise data, such as geographical data, which may have been stored in a memory of its host device. In an example, the beacon 102 may be used in scenario 100 as a location beacon. Thus, the beacon 102 may use a BLE module to broadcast a signal that may provide one of the computing devices with precise geographical information. In yet other examples, a BLE module may be used to transmit advertising packets, which may include data that may have been collected by the host device. For example, the advertising packets may include meteorological data gathered by a sensor of the host device.

Furthermore, in some instances, the mode of operation of a BLE module may affect its power consumption. For example, a BLE module may decrease its power consumption by using advertising protocols. Advertising protocols may maintain the low power consumption of a BLE module by periodically broadcasting a signal during certain time intervals. During time intervals when a BLE module is not broadcasting a signal, the BLE module may idle in a standby mode. Alternatively, the BLE module may turn off. Accordingly, by turning on only when transmitting a signal in an active transmit mode, a BLE module may decrease its power consumption, which may be advantageous for devices with a finite power source. As such, advertising protocols are designed to allow a BLE module to advertise data to one or more computing devices while maintaining the low power consumption.

Furthermore, BLE protocols include different types of advertising packets. The advertising packet type may at least specify a configuration of a BLE module. For instance, the advertising packet type may specify whether the BLE module is connectable and/or scannable. A connectable BLE module may pair with another Bluetooth device, and a scannable BLE module may transmit a data packet in response to receiving a scan request from another Bluetooth device. Furthermore, an advertising packet may be a directed packet. A directed packet may include a BLE module's address and the receiver device's address, whereas an undirected packet may not be directed toward a particular receiver.

In some embodiments, a BLE module may include only the BLE transmitter 200 and, therefore, may not be able to operate in a connectable configuration. Furthermore, the transmitter 200 may not be able to receive scan requests from other Bluetooth devices. Accordingly, in some embodiments, a BLE module may operate in a non-connectable and non-scannable configuration in order to decrease power consumption. However, in other embodiments, a BLE module may include a transceiver. In such embodiments, the BLE module may operate in a connectable and/or a scannable configuration.

There can be other advantages to the BLE advertising protocols in addition to low power consumption of a BLE module operating in accordance with advertising protocols. For example, in scenario 100, the computing devices 106 and 108 may discover Bluetooth devices located near the computing device faster (and consuming less energy) using advertising protocols than by using other protocols. As described elsewhere herein, advertising protocols may use three fixed channels of a wireless spectrum, e.g., the 2.4 GHz wireless spectrum. Thus, the computing devices 106 and 108 may detect other Bluetooth devices by only scanning the three fixed channels, rather than scanning a broad wireless spectrum, which may allow for receiving and sending BLE advertisement packets faster than other protocols.

Returning to FIG. 2, the BLE packetizer 202 may use the data included in the signal received via the HCI to generate a data signal, which may include one or more data packets. Accordingly, the BLE packetizer 202 may receive instructions to generate a data signal including one or more data packets according to the advertising protocol. Further, the instructions may detail the type of advertising packet to broadcast. For instance, as explained above, the type of advertising packet may determine whether a BLE module is connectable and/or scannable, and/or whether the packet is directed. In an example, the BLE packetizer 202 may receive data indicative of instructions to generate a data signal that includes a non-connectable, non-scannable, and undirected advertising packet. In another example, the BLE packetizer 202 may receive data indicative of instructions to generate a data signal that includes a scannable and undirected advertising packet.

Figure 3:
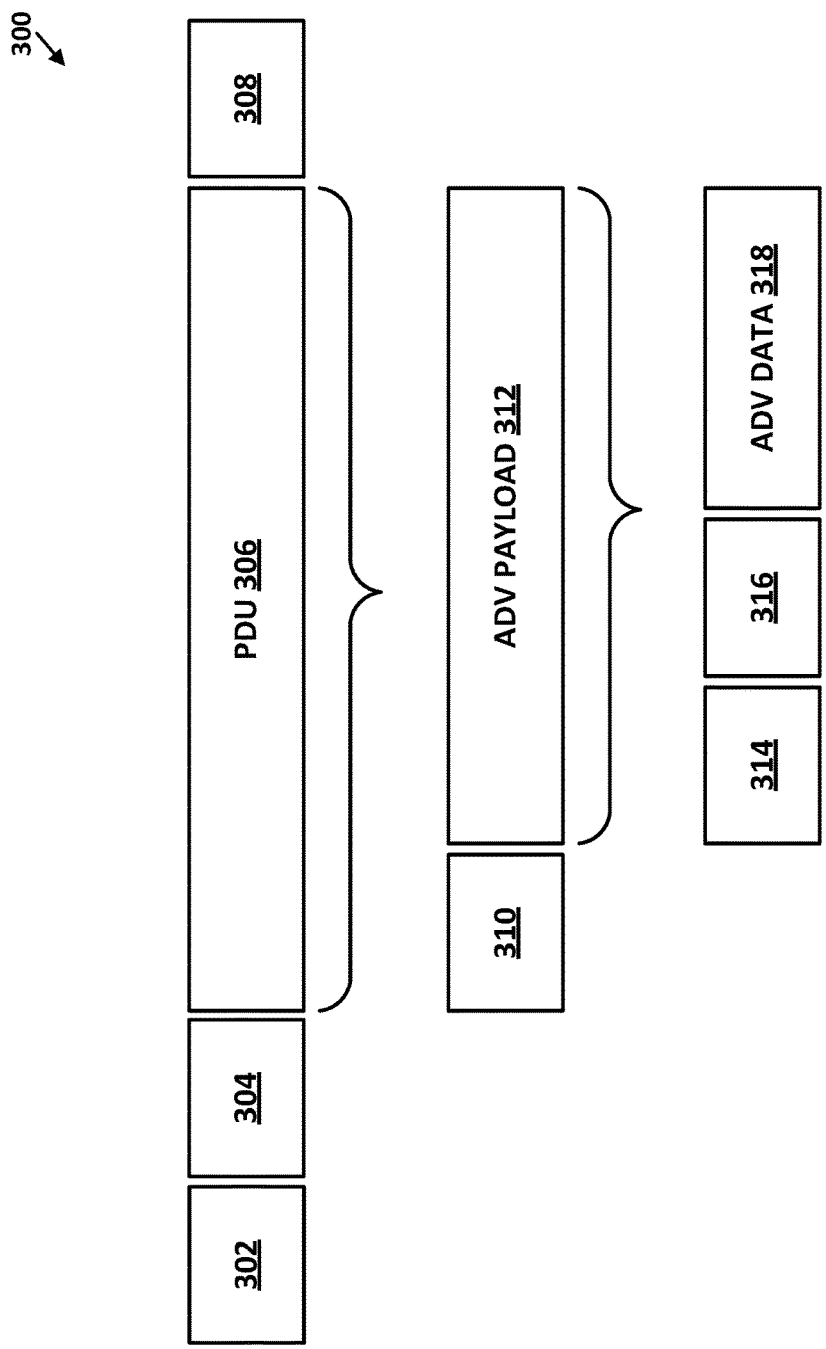
FIG. 3 illustrates an advertisement packet, in accordance with an example embodiment.

FIG. 3 illustrates an example advertising packet. In particular, an advertising packet 300 may, for example, take the form of any advertising packets described above in relation to the FIG. 1. In some additional embodiments, a Bluetooth tag or a BLE module may communicate the advertisement packet 300. As shown in FIG. 3, advertising packet 300 may include preamble 302, access address 304, payload data unit (PDU) 306 with 2 to 39 bytes, and cyclic redundancy check (CRC) 308.

In addition, PDU 306 may include header 310 and advertisement payload 312 with 6 to 37 bytes. Further, advertisement payload 312 may include header 314, MAC address 316, and advertisement data 318 with up to 31 bytes. In an example, the 31 byte space may contain sensor data that may be communicated via the advertisement packet. Other sizes of the PDU 306 may be possible. For example, the PDU 306 may include data greater than 39 bytes. Similarly, any of the components of the PDU 306 may include data greater or less than the sizes described above. Further, the CRC may include data codes which may detect any errors that may occur in the PDU 306 during transmission. Further, the header 314 may include a type of the PDU 306. The type of PDU 306 may specify the type of the advertisement packet. As explained above, the advertisement packet type may be a non-connectable, scannable, and undirected packet type.

Returning to FIG. 2, the oscillator 204 may generate an RF carrier signal that may carry the data signal generated by the BLE packetizer 202. The RF signal carrying the data may then be broadcast by an antenna. As illustrated in FIG. 2, the oscillator 204 may be a free-running oscillator, which may be used to directly generate an RF carrier signal. Thus, a free-running oscillator may replace a frequency synthesizer (e.g., Phase Locked Loop (PLL) synthesizer) to generate an RF carrier signal. Using a free-running oscillator may result in considerable power savings as compared to using a frequency synthesizer, which may be advantageous for low power devices.

Further, both the turn-on time for the frequency synthesizer to lock to its frequency reference and the turn-on time of its frequency reference circuit may be significant compared to the packet duration. Therefore, the turn-on time (i.e., the time to go from sleep mode to active transmit mode) for a transmitter using a frequency synthesizer may be greater than a transmitter using a free-running oscillator. A longer turn-on time may result in greater power dissipation. Accordingly, using the free-running oscillator, which may have a reduced turn-on time compared to a frequency synthesizer, may result in further power savings.

The free-running oscillator may directly generate the RF carrier signal, which may have a frequency within a wireless spectrum, e.g., the 2.4 GHz wireless spectrum. Within examples, the free-running oscillator may directly generate an RF carrier signal that has a frequency of one of the three channels in the 2.4 GHz band that are allocated to BLE advertising protocols according to Bluetooth specifications. The three "advertisement channels" are specified as 1 MHz wide channels with frequencies of 2.402 GHz, 2.480 GHz, and 2.426 GHz.

Note that the example oscillator provided in FIG. 2 and the accompanying description herein is for illustrative purposes only and should not be considered limiting. For instance, the transmitter 200 may include more than one free-running oscillator. In an example, the BLE transmitter 200 may include three free-running oscillators, each of which may be used to generate a carrier signal at a frequency of the three BLE channels. In such examples, the BLE transmitter 200 may utilize methods such as multichannel transmission and frequency hopping.

Within examples, the free-running oscillator 204 may include a Pierce oscillator circuit or a Colpitts oscillator circuit. The oscillator 204 may include a transistor, a biasing resistor, capacitors, and a resonator. The resonator, which may be located off of the IC of the BLE transmitter 200, may be used as a filter to filter the oscillation frequency. Further, the total capacitance of the capacitors in the oscillator 204, as seen by the resonator, may be referred to as the "load capacitance." The load capacitance may affect how far the oscillator loop is resonating, relative to the desired resonant frequency. Accordingly, selectively choosing the resonator, which may have a specific load capacitance requirement, may determine the oscillation frequency.

Within examples, the resonator in the oscillator 204 may be a thin-film bulk acoustic resonator (FBAR). An FBAR resonator may include a piezoelectric thin film between two metal layers. FBAR resonators are high-Q resonators that may have a stable and a low phase-noise center frequency, which may be the oscillation frequency. Within examples, FBAR resonators may have a Q of several hundred. In other examples, FBAR resonators may have an (unloaded) Q of over two thousand. Further, temperature compensation may be used to maintain the center frequency of the FBAR resonator at the frequency of the wireless channel.

Note that the example resonator discussed above is for illustrative purposes only and should not be considered limiting. For instance, the resonator may be any resonator that may be a high frequency resonator, which may provide an oscillation frequency with a stability and an accuracy that may meet Bluetooth standards. In other examples, the resonator may be a crystal resonator. In yet another example, the resonator may be a quartz resonator.

As noted above, the RF carrier signal generated by the oscillator 204 may be used to carry the data signal generated by the BLE packetizer 202. More specifically, the data signal generated by the BLE packetizer 202 may act as a tuning code, which may have a specific symbol rate. Further, the tuning code may be used to directly modulate the RF carrier signal. Accordingly, the modulated RF carrier signal may carry the data signal generated by the BLE packetizer 202. Within examples, the tuning code may modulate the RF carrier signal according to at least BLE protocols.

For instance, BLE protocols specify using Gaussian Frequency Shift Keying (GFSK) as the modulation scheme to modulate the RF carrier signal. Accordingly, the tuning code may be used to modulate the RF carrier signal to two different frequencies of the same advertising channel according to GFSK. Additionally and/or alternatively, the tuning code may be used to modulate the RF carrier signal to two different frequencies of the same advertising channel according to Binary Frequency Shift Keying (BFSK). The oscillator 204 may include a bank or an array of switched capacitors, which may be used to adjust the load capacitance of the oscillator 204. As explained above, adjusting the load capacitance of the oscillator 204 may adjust the oscillation frequency. The digital data signal, indicative of digital "0" and "1," may be used to modify the load capacitance of the oscillator 204, such that the oscillator 204 may generate a modulated signal of two frequencies, one of which corresponds to digital "0" and the other to digital "1."

The modulated RF signal, carrying the data signal, may be transmitted to a class-D power amplifier 206 as illustrated in FIG. 2. However, also note that at least a portion of the modulated signal may be transmitted to a prescaler 208. The prescaler 208 may scale the signal and provide the scaled signal to the BLE packetizer 202, where it may be used as a clock source. For instance, the prescaler 208 may scale down the 2.48 GHz signal to a 1 MHz or 8 MHz signal. By using a portion of the carrier signal as a clock source for the BLE packetizer 202, there may be no need for a separate timing source for the BLE packetizer 202, thereby further increasing power savings.

Furthermore, as illustrated in FIG. 2, the modulated RF carrier signal may be amplified using the class-D power amplifier 206. The amplified signal may then be transmitted to the antenna (represented as "RF" in FIG. 2) where it may be broadcast over the air. As explained above, in some embodiments, a BLE module may be operating in an advertising mode, which involves the BLE module periodically transmitting advertising packets. Accordingly, the broadcast RF signal may include advertisement packets, which may be received by one or more Bluetooth devices.

A BLE module may be powered by the powertrain 210. The powertrain may include a low dropout regulator (LDO) 228, a power on reset (PoR) 222, a bandgap voltage reference (Bandgap) 226, and a real time clock (RTC) 224. Note that the RTC 224 may have a low frequency and may operate without a crystal reference, as the BLE packetizer 202 may use a signal from the oscillator 204 as explained above.

Figure 4A:
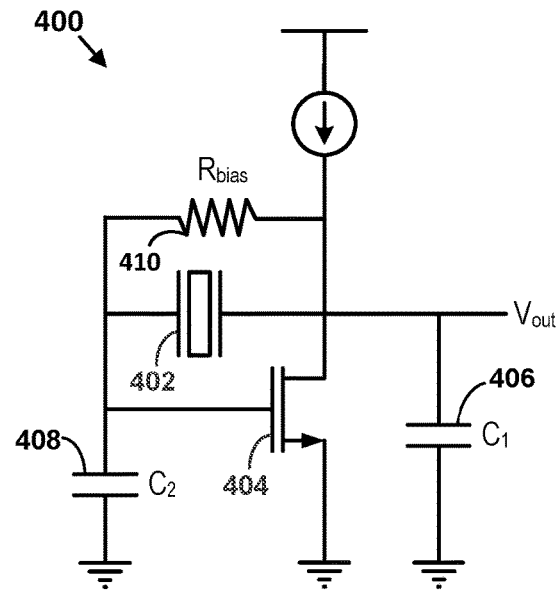
FIG. 4A illustrates an oscillator, in accordance with an example embodiment.
Figure 4B:
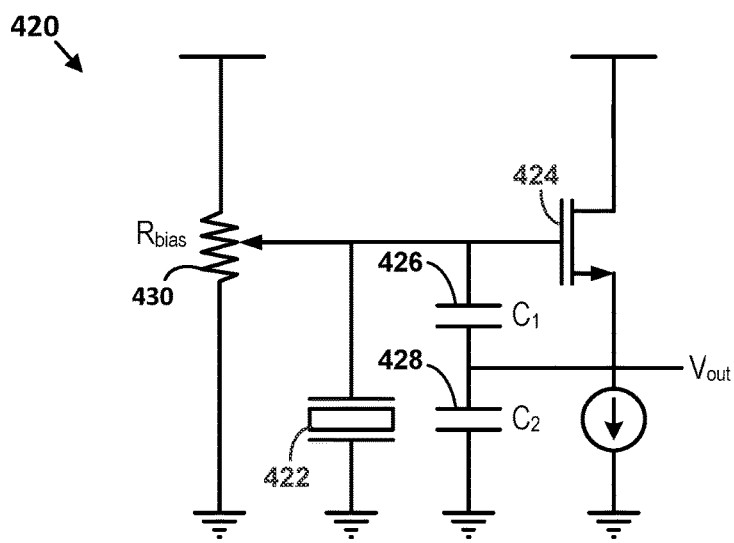
FIG. 4B illustrates an oscillator, in accordance with an example embodiment.

FIGS. 4A and 4B illustrate example oscillator circuits for use in a BLE module. For example, the example oscillator circuits depicted in FIGS. 4A and 4B may serve as oscillator 204 in the BLE transmitter 200 depicted in FIG. 2, which may or may not operate in the connectable configuration (e.g., capable of pairing with another Bluetooth device) and/or the scannable configuration (e.g., broadcasting an advertising packet in response to receiving a scan request from another Bluetooth device).

In particular, FIG. 4A illustrates a Pierce oscillator circuit 400. The Pierce oscillator circuit 400 may include a resonator 402, a transistor 404, capacitors $C_1$ 406 and $C_2$ 408, and a biasing resistor 410. As discussed above with respect to FIG. 2, the resonator 402 may be an FBAR resonator that oscillates at an RF frequency. In other examples, the resonator may be any resonator that may be a high frequency resonator, which may provide an oscillation frequency with a stability and an accuracy that may meet Bluetooth standards, such as a crystal resonator. While the transistor 404 is depicted in FIG. 4A as a metal-oxide-semiconductor field-effect transistor (MOSFET), the transistor 404 may be any type of amplifying transistor. In some examples, the transistor 404 may include more than one transistor and/or may take the form of an operational amplifier.

As depicted in FIG. 4A, a Pierce oscillator circuit includes a pi-network feedback circuit arrangement. In this arrangement, one terminal of the resonator 402 is connected to capacitor $C_1$ 406, and the other terminal of the resonator 402 is connected to capacitor $C_2$ 408, while capacitors $C_1$ 406 and $C_2$ 408 are coupled to ground. In operation, the FBAR resonator 402 may appear inductive at frequencies different from its resonant frequency, and the oscillation frequency of the FBAR resonator 402 may be adjusted by varying its load capacitance. Accordingly, by varying the capacitance of capacitors $C_1$ 406 and $C_2$ 408 the load capacitance of the FBAR resonator 402 may be varied, and, consequently, the oscillation frequency of the Pierce oscillator circuit 400 may be varied as well.

As noted above with respect to FIG. 2, the data signal generated by the BLE packetizer 202 may act as a tuning code that may be used to directly modulate an RF signal generated by the Pierce oscillator circuit 400, such that the modulated RF signal may carry the data signal generated by the BLE packetizer 202. Within examples, the tuning code may modulate the RF signal generated by the Pierce oscillator circuit 400 according to at least BLE protocols.

For instance, the tuning code may be used to modulate the RF signal to two different frequencies of the same advertising channel according to GFSK. Additionally and/or alternatively, the tuning code may be used to modulate the RF signal to two different frequencies of the same advertising channel according to BFSK. In some examples, the capacitors $C_1$ 406 and $C_2$ 408 may each represent a bank of switched capacitors, which may be used to adjust the load capacitance of the FBAR resonator 402. As explained above, adjusting the load capacitance of the FBAR resonator 402 may adjust the oscillation frequency of the Pierce oscillator circuit 400. The digital data signal, indicative of digital "0" and "1," may be used to modify the load capacitance of the FBAR resonator 402, such that the Pierce oscillator circuit 400 may generate a modulated signal of two frequencies, one of which corresponds to digital "0" and the other to digital "1."

FIG. 4B illustrates a Colpitts oscillator circuit 420. Similar to the Pierce oscillator circuit 400, the Colpitts oscillator circuit 420 may include a resonator 422, a transistor 424, capacitors $C_1$ 426 and $C_2$ 428, and a biasing resistor 430. As discussed above with respect to FIG. 2, the resonator 422 may be an FBAR resonator that oscillates at an RF frequency. In other examples, the resonator may be any resonator that may be a high frequency resonator, which may provide an oscillation frequency with a stability and an accuracy that may meet Bluetooth standards, such as a crystal resonator. While the transistor 424 is depicted in FIG. 4B as a MOSFET, the transistor 424 may be any type of amplifying transistor. In some examples, the transistor 424 may include more than one transistor and/or may take the form of an operational amplifier.

As depicted in FIG. 4B, a Colpitts oscillator circuit 420 includes a capacitive voltage divider feedback circuit arrangement. In this arrangement, capacitors $C_1$ 426 and $C_2$ 428 are coupled in series to form a voltage divider. One terminal of the resonator 422 is connected to the transistor 424, and the other terminal of the resonator 422 is connected to ground. In operation, the FBAR resonator 422 may appear inductive at frequencies different from its resonant frequency, and the oscillation frequency of the FBAR resonator 422 may be adjusted by varying its load capacitance. Accordingly, by varying the capacitance of capacitors $C_1$ 426 and C₂ 428 the load capacitance of the FBAR resonator 422 may be varied, and, consequently, the oscillation frequency of the Colpitts oscillator circuit 420 may be varied as well.

As noted above with respect to FIG. 2, the data signal generated by the BLE packetizer 202 may act as a tuning code that may be used to directly modulate an RF signal generated by the Colpitts oscillator circuit 420, such that the modulated RF signal may carry the data signal generated by the BLE packetizer 202. Within examples, the tuning code may modulate the RF signal generated by the Colpitts oscillator circuit 420 according to at least BLE protocols.

For instance, the tuning code may be used to modulate the RF signal to two different frequencies of the same advertising channel according to GFSK. Additionally and/or alternatively, the tuning code may be used to modulate the RF signal to two different frequencies of the same advertising channel according to BFSK. In some examples, the capacitors C₁ 426 and C₂ 428 may be a bank of switched capacitors, which may be used to adjust the load capacitance of the FBAR resonator 422. As explained above, adjusting the load capacitance of the FBAR resonator 422 may adjust the oscillation frequency of the Colpitts oscillator circuit 420. The digital data signal, indicative of digital "0" and "1," may be used to modify the load capacitance of the FBAR resonator 422, such that the Colpitts oscillator circuit 420 may generate a modulated signal of two frequencies, one of which corresponds to digital "0" and the other to digital "1."

Figure 4C:
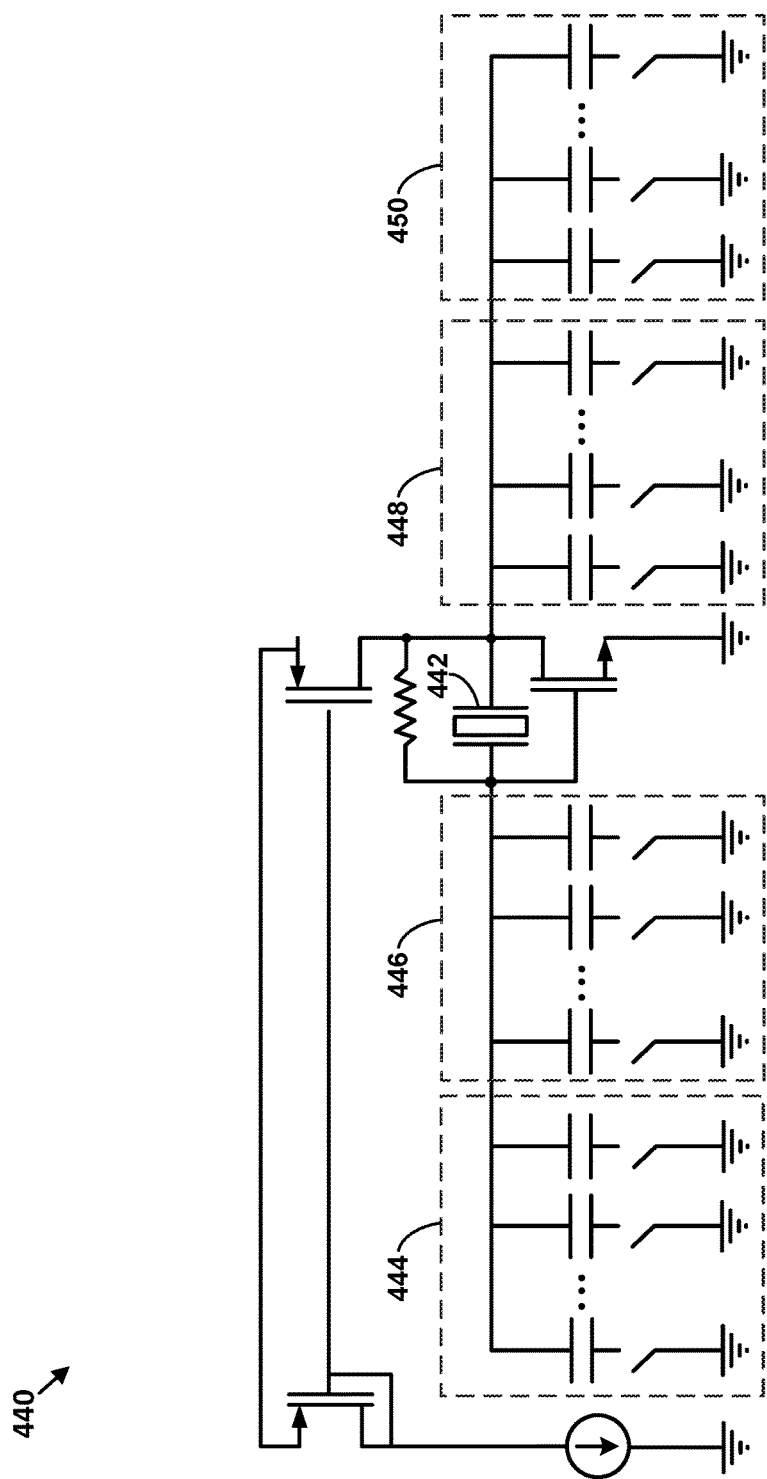
FIG. 4C illustrates an oscillator, in accordance with an example embodiment.

FIG. 4C illustrates an oscillator circuit 440 that includes four capacitor arrays (which are represented in FIG. 4A as capacitors 406 and 408, and in FIG. 4B as capacitors 426 and 428). In an embodiment, two capacitor arrays may be "right" capacitor arrays that are connected to the right side of the FBAR 442. Further, the other two capacitor arrays may be "left" capacitor arrays that are connected to the left side of the FBAR 442. For example, the capacitor arrays 444 and 446 may be right capacitor arrays, and the capacitor arrays 448 and 450 may be left capacitor arrays. Further, two of the capacitor arrays may be fine capacitor arrays, and two of the capacitor arrays may be coarse capacitor arrays. For example, the capacitor arrays 444 and 448 may be fine capacitor arrays, and the capacitor arrays 446 and 450 may be coarse arrays.

In an embodiment, the coarse capacitor arrays 446 and 450 may have a larger tuning step than the fine capacitor arrays 444 and 448. Further, the coarse capacitor arrays 446 and 450 may have a larger tuning range than the fine capacitor arrays 444 and 448. As such, the coarse capacitor arrays 446 and 450 may be switched on or off to quickly tune the frequency of the signal generated by the FBAR to a frequency near the target frequency (e.g., 2.402 GHz, 2.480 GHz, or 2.426 GHz). The fine capacitor arrays 444 and 448 may be switched on or off to tune the frequency of the signal generated by the FBAR to the target frequency.

Note that the example oscillator circuits provided in FIGS. 4A, 4B, and 4C and the accompanying description herein is for illustrative purposes only and should not be considered limiting. For instance, the oscillator circuits may include additional and/or alternative components than depicted. Further, Pierce and Colpitts oscillator circuits may take various forms, and the BLE devices described herein should not be limited to the depicted oscillator circuit configurations. For example, in some embodiments, the Colpitts oscillator circuit 420 may include a bipolar junction transistor (BJT) arranged in a common base configuration.

In some examples, an oscillator, such as oscillator 204 of BLE transmitter 200 depicted in FIG. 2, may include three Pierce oscillator circuits 400, each of which may be used to generate a carrier signal at a frequency of one of the three BLE channels. In some examples, an oscillator, such as oscillator 204 of BLE transmitter 200 depicted in FIG. 2, may include three Colpitts oscillator circuits 420, each of which may be used to generate a carrier signal at a frequency of one of the three BLE channels.

In examples where the BLE transmitter 200 includes more than one of the Pierce oscillator circuits 400 or Colpitts oscillator circuits 420, the BLE transmitter 200 may modulate each of the RF carrier signals generated by the Pierce oscillator circuits 400 or Colpitts oscillator circuits 420 to carry the data signal generated by the BLE packetizer 202. In this manner, the data signal generated by the BLE packetizer 202 may be concurrently broadcast on each of the RF carrier signals. In one example, the data signal generated by the BLE packetizer 202 may be concurrently broadcast on all three BLE channels.

In other examples where the BLE transmitter 200 includes more than one of the Pierce oscillator circuits 400 or Colpitts oscillator circuits 420, the BLE transmitter 200 may modulate one or two of the RF carrier signals generated by the Pierce oscillator circuits 400 or Colpitts oscillator circuits 420 to carry the data signal generated by the BLE packetizer 202. In this manner, the data signal generated by the BLE packetizer 202 may be broadcast on only one of the three BLE channels or concurrently broadcast on two of the three BLE channels.

Still in other examples where the BLE transmitter 200 includes more than one of the Pierce oscillator circuits 400 or Colpitts oscillator circuits 420, the BLE transmitter 200 may employ time division multiplexing (TDM) to modulate the RF carrier signals generated by the Pierce oscillator circuits 400 or Colpitts oscillator circuits 420 to carry the data signal generated by the BLE packetizer 202. In this manner, the data signal generated by the BLE packetizer 202 may be carried on a first RF signal (e.g., a 2.402 GHz signal) for a given amount of time, then carried on a second RF signal (e.g., a 2.480 GHz signal) for a given amount of time, and then carried on a third RF signal (e.g., a 2.426 GHz signal) for a given amount of time. Note that, in some examples, TDM may be used to carry the data signal on more or fewer than three RF signals.

Figure 5A:
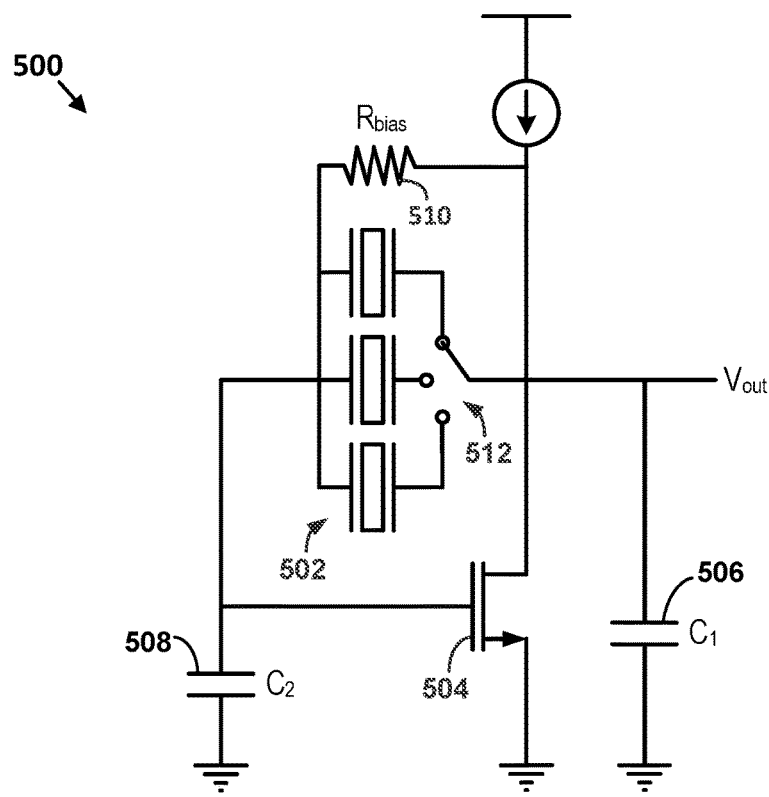
FIG. 5A illustrates an oscillator, in accordance with an example embodiment.
Figure 5B:
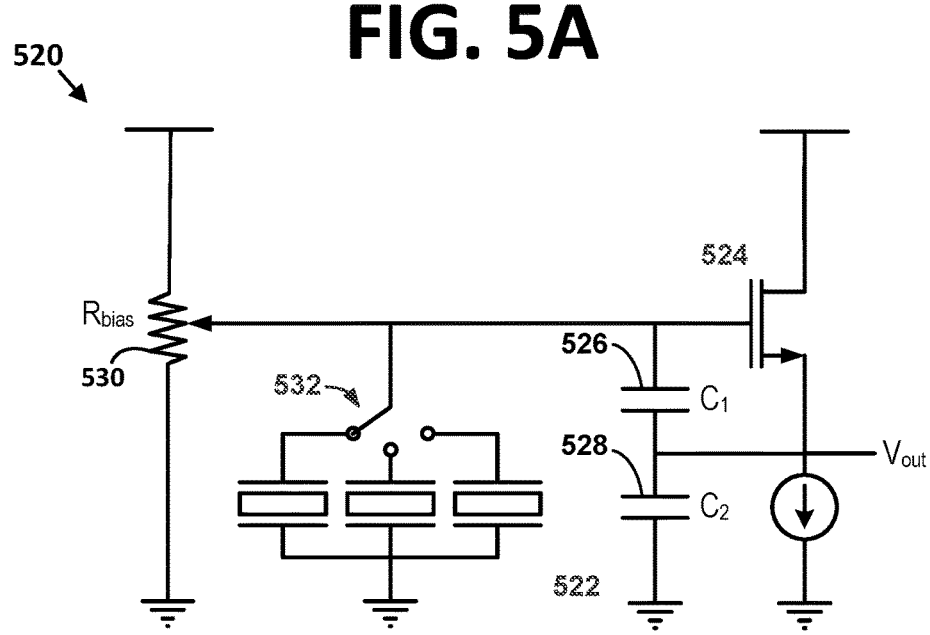
FIG. 5B illustrates an oscillator, in accordance with an example embodiment.

As noted, reducing the size and power consumption of a BLE module allows for longer operation and more versatile applications and/or uses. Accordingly, it may be advantageous to generate multiple carrier signals with a single oscillator circuit. FIGS. 5A and 5B depict example oscillator circuits that produce multiple carrier signals for use in a BLE device. In some examples, the oscillator circuits depicted in FIGS. 5A and 5B may serve as oscillator 204 in the BLE transmitter 200 depicted in FIG. 2, which may or may not operate in the connectable configuration (e.g., capable of pairing with another Bluetooth device) and/or the scannable configuration (e.g., broadcasting an advertising packet in response to receiving a scan request from another Bluetooth device).

FIG. 5A illustrates a Pierce oscillator circuit 500. Like the Pierce oscillator circuit 400 depicted in FIG. 4A, Pierce oscillator circuit 500 may include a transistor 504, capacitors C₁ 506 and C₂ 508, and a biasing resistor 510. However, rather than including a single resonator, the Pierce oscillator circuit 500 may include a number of resonators 502. The resonators 502 may be FBAR resonators or high frequency resonator that may provide an oscillation frequency with a stability and an accuracy that may meet Bluetooth standards, such as crystal resonators.

As depicted in FIG. 5A, the Pierce oscillator circuit 500 includes three resonators 502. Each of the three resonators 502 may respectively oscillate at one of the frequencies of the three BLE channels. Note that, in other examples, the Pierce oscillator circuit 500 may include more or fewer than three resonators, and the resonators may oscillate at various frequencies.

In operation, a switch 512 may toggle between terminals of the resonators 502, such that only one of the resonators 502 is connected to the Pierce oscillator circuit 500 at any given time. As illustrated in FIG. 5A, the switch 512 may connect a terminal on one side of the resonators 502 to capacitor $C_1$ 506 while the terminals on the other side of the resonators remain coupled to capacitor $C_2$ 508. In another example, the switch 512 may connect a terminal on one side of the resonators 502 to capacitor $C_2$ 508 while the terminals on the other side of the resonators remain coupled to capacitor $C_1$ 506. In another example, the switch 512 may connect a terminal on one side of the resonators 502 to capacitor $C_1$ 506 and a terminal on the other side of the resonators 502 to capacitor $C_2$ 508. The switch 512 may have a low resistance to minimize power loss and performance degradation of the Pierce oscillator circuit 500. Further, the switch 512 may have a low capacitance to minimize capacitive loading of the resonators 502.

In some examples, a BLE module, such as the BLE transmitter 200 illustrated in FIG. 2, may employ time division multiplexing when toggling the switch 512. In this manner, the Pierce oscillator circuit 500 may generate a first RF signal with one of the resonators 502 for a given period of time, a second RF signal with another one of the resonators 502 for a given period of time, and a third RF signal with yet another one of the resonators 502 for a given period of time. In some examples, each of these three RF signals may have a respective frequency within the three respective BLE channels. Further, each of these RF signals may be modulated by the data signal generated by the BLE packetizer 202, amplified by the amplifier 206, and broadcast over the air. In other examples, time division multiplexing may be used similarly to select between more or fewer than three RF signals.

FIG. 5B illustrates a Colpitts oscillator circuit 520. Like the Colpitts oscillator circuit 420 depicted in FIG. 4B, Colpitts oscillator circuit 520 may include a transistor 524, capacitors $C_1$ 526 and $C_2$ 528, and a biasing resistor 530. However, rather than including a single resonator, the Colpitts oscillator circuit 520 may include a number of resonators 522. The resonators 522 may be FBAR resonators or high frequency resonator that may provide an oscillation frequency with a stability and an accuracy that may meet Bluetooth standards, such as crystal resonators.

As depicted in FIG. 5B, the Colpitts oscillator circuit 520 includes three resonators 522. Each of the three resonators 522 may respectively oscillate at one of the frequencies of the three BLE channels. In some examples, the Colpitts oscillator circuit 520 may include more or fewer than three resonators, and the resonators may oscillate at various frequencies.

In operation, a switch 532 may toggle between terminals of the resonators 522, such that only one of the resonators 522 is connected to the Colpitts oscillator circuit 520 at any given time. As illustrated in FIG. 5B, the switch 532 may connect a terminal on one side of the resonators 522 to the transistor 524 while the terminals on the other side of the resonators remain coupled to ground. In another example, the switch 532 may connect a terminal on one side of the resonators 522 to ground while the terminals on the other side of the resonators remain coupled to the transistor 524. In another example, the switch 532 may connect a terminal on one side of the resonators 522 to the transistor 524 and a terminal on the other side of the resonators 522 to ground. The switch 532 may have a low resistance to minimize power loss and performance degradation of the Colpitts oscillator circuit 520. Further, the switch 532 may have a low capacitance to minimize capacitive loading of the resonators 522.

In some examples, a BLE module, such as the BLE transmitter 200 illustrated in FIG. 2, may employ time division multiplexing when toggling the switch 532. In this manner, the Colpitts oscillator circuit 520 may generate a first RF signal with one of the resonators 522 for a given period of time, a second RF signal with another one of the resonators 522 for a given period of time, and a third RF signal with yet another one of the resonators 522 for a given period of time. In some examples, each of these three RF signals may have a respective frequency within the three respective BLE channels. Further, each of these RF signals may be modulated by the data signal generated by the BLE packetizer 202, amplified by the amplifier 206, and broadcast over the air. In other examples, time division multiplexing may be used similarly to select between more or fewer than three RF signals.

As noted previously, the resonator or resonators of the oscillator 204 may be located on a separate IC from the oscillator 204. In order to further reduce the size of a BLE module, multiple resonators may be fabricated on a single die.

III. Temperature Compensation

Environmental conditions may affect the performance of the beacon 102. For example, the performance of the beacon 102 may be affected by temperature. Temperature may affect the frequency of the RF signal that may be generated by the BLE transmitter 200. Therefore, a change in temperature may cause a shift in the frequency of the generated RF signal. That is, the frequency of the generated RF signal may be a function of temperature.

As explained above, the oscillator 204 may be designed to generate an RF signal at a target frequency (e.g., 2.402 GHz, 2.480 GHz, or 2.426 GHz). In an embodiment, the frequency of the generated RF signal may drift from the target frequency if the temperature is outside a nominal operating temperature range at which the oscillator 204 may generate the target frequency. The temperature may affect the performance of the resonator (e.g., resonator 402), which may affect the frequency of the generated signal. A resonator's temperature coefficient of frequency may indicate a change of frequency generated by the resonator, in ppm, per degree Celsius)(ppm/C°. The temperature may also affect the performance of the components of the BLE transmitter, such as the capacitor array of the oscillator 204, which may also affect the frequency of the generated RF signal.

Frequency drift may cause reliability issues as the frequency of the RF signal may drift into the frequency range of channels other than the target wireless channel. Thus, a receiver, which may be scanning the target wireless channel in order to receive the RF signal, may not receive the broadcast RF signal. Additionally, the frequency drift may cause interference with other signals due to the RF signal being broadcast on a wireless channel other than the target wireless channel.

In an embodiment, temperature compensation may be used to maintain the frequency of the generated RF signal at or near the target frequency. That is, a temperature compensation signal may be generated to compensate for the effects of temperature on the resonator. The compensation signal may also compensate for the effects of temperature on the components of the BLE transmitter. Note that the frequency drift within a short BLE packet transmission time (e.g., 400 microseconds) may be relaxed. As such, the compensation signal may be applied before the packet transmission and may be assumed to be correct for the duration of the packet transmission. Therefore, in an embodiment, the temperature compensation may be open-loop temperature compensation where the compensation signal is not applied continuously, which may increase power savings.

Figure 6:
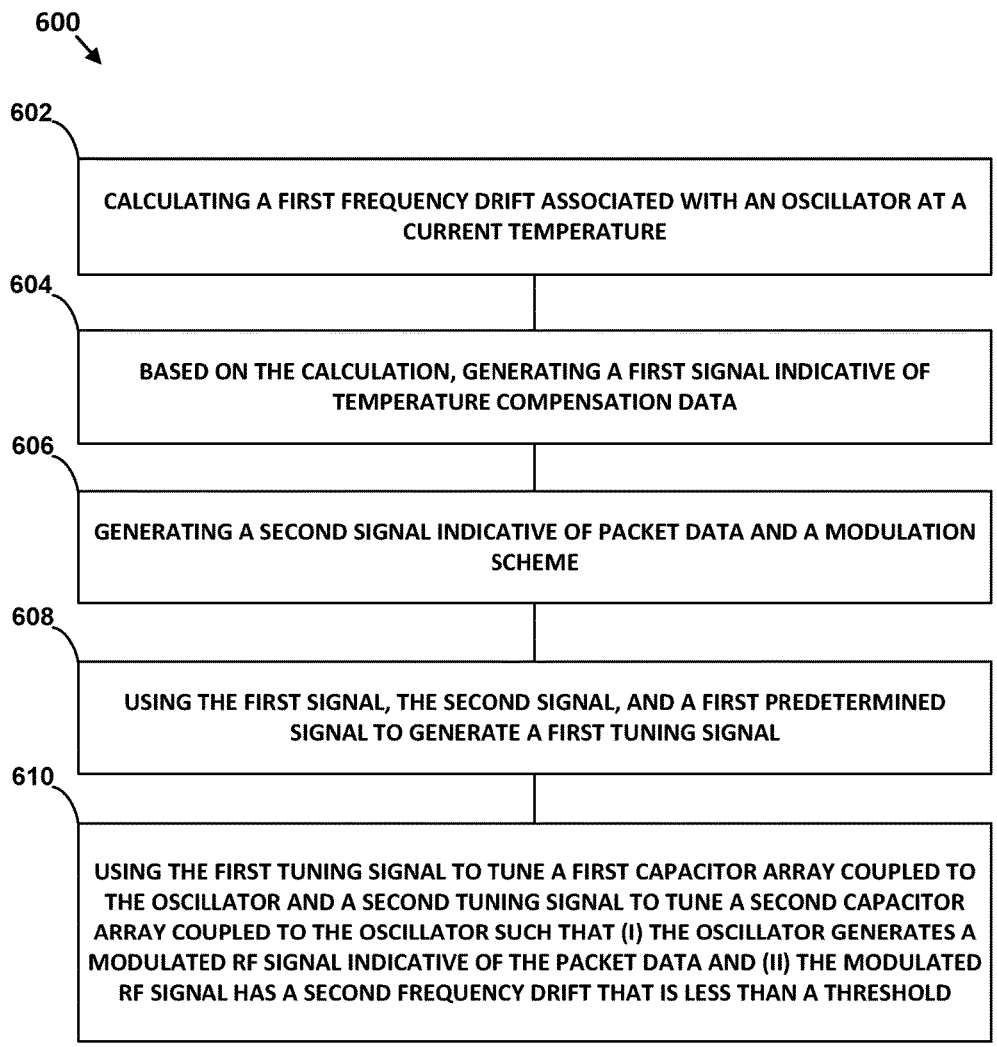
FIG. 6 is a flow diagram of a method, in accordance with an example embodiment.

FIG. 6 illustrates a flow diagram of a method 600 of temperature compensation, according to an example embodiment. In particular, the method 600 may be carried out or implemented by one or more of devices, such as the Bluetooth devices described herein. For example, the method 600 may be carried out by the beacon 102 to facilitate compensation of the temperature coefficient (TC) of the resonator. As such, the method 600 may compensate for the effects of temperature on the oscillator 204 and on other components of the BLE transmitter 200. Within examples, the oscillator 204 may be one or more of the oscillator circuits described in relation to FIGS. 4A, 4B, 4C, 5A, and 5B. Accordingly, one or more Pierce oscillator circuits with one or more FBAR resonators may generate the RF signals.

Further, the method 600 may include one or more steps, processes, and/or functions as illustrated by one or more of blocks 602 through 610. Although the blocks are illustrated in a sequential order, a number of these blocks may also be performed simultaneously and/or in a different order than those illustrated. Also, the various blocks may be combined into fewer blocks, divided into additional blocks, and/or removed based upon specific implementations. Also, although the method 600 is described herein as being carried out by a BLE beacon using BLE protocols, the method may also be carried out by other devices using other protocols.

In an embodiment, the method 600 may performed by the packetizer 202 of the beacon 102. As explained above, the packetizer 202 may generate a tuning signal that may be indicative of the packet data and the modulation scheme. Such a tuning signal may be used to tune the oscillator 204 such that the oscillator 204 generates a modulated RF signal oscillating at the target frequency. In an embodiment, the packetizer 202 may perform method 600 such that the tuning signal generated by the packetizer 202 may be indicative of the modulation scheme, the packet data, and a temperature compensation signal. Thus, in a scenario where the temperature may affect the performance of the BLE transmitter 200, the packetizer 202 may generate a tuning code that may be used to tune the oscillator 204 such that the oscillator 204 generates a modulated RF signal with a frequency at or near the target frequency.

Figure 7:
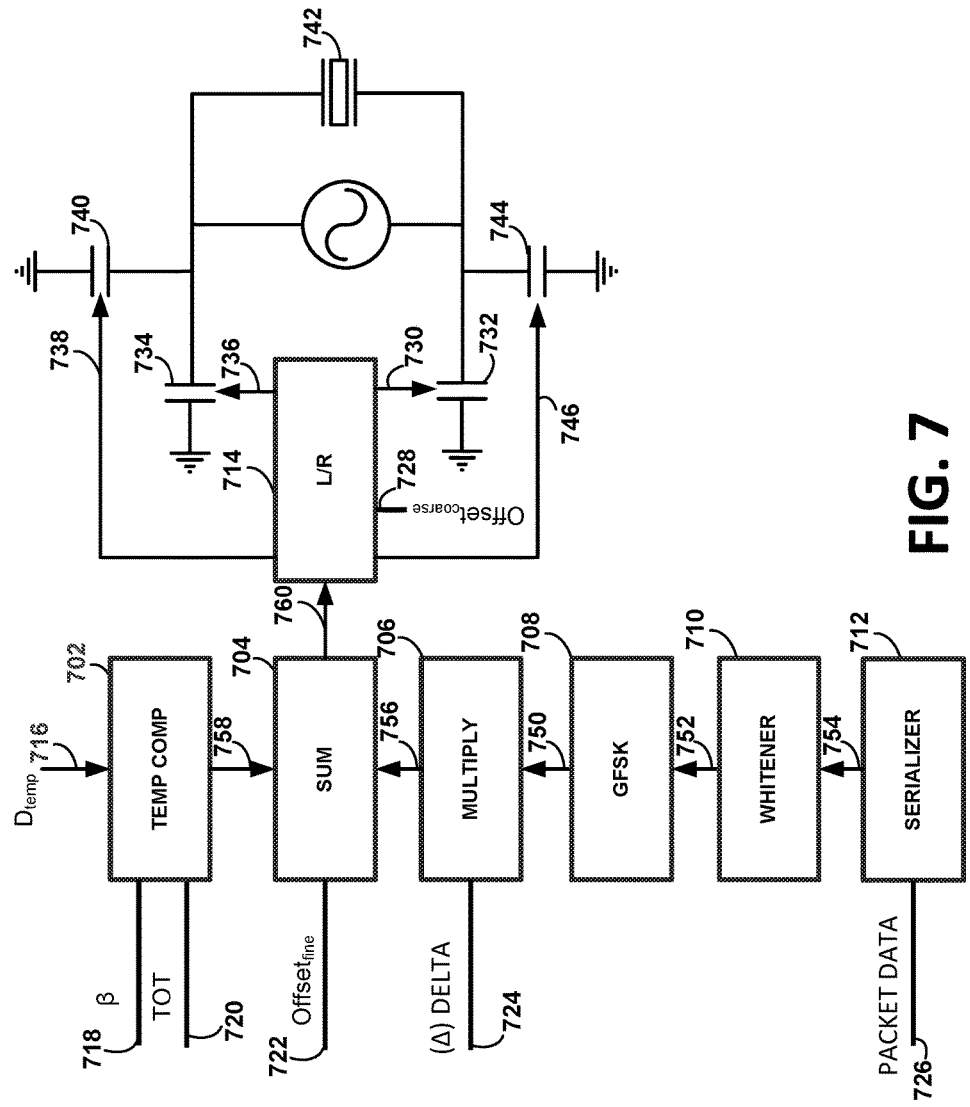
FIG. 7 illustrates a beacon, in accordance with an example embodiment.

FIG. 7 illustrates modules of the packetizer 202, according to an exemplary embodiment. Within examples, the modules of the packetizer 202 may be a temperature compensation module 702, a sum module 704, a multiply module 706, a GFSK module 708, a whitener 710, a serializer 712, and an L/R 714. In an example, each of the modules may represent a different function that may be performed by the packetizer 202. Note that the different functions associated modules of the packetizer 202 may also be described as function performed by the packetizer 202. Also, the modules may be combined into fewer modules, divided into additional modules, and/or removed based upon specific implementations. Further note that the modules may be a part of components of the beacon 102 other than the packetizer 202. As such, the functions associated with the modules may be performed by components of the beacon 102 other than the packetizer 202.

Furthermore, FIG. 7 illustrates some of the components of the oscillator 204. For example, FIG. 7 illustrates an FBAR 742, which may be used to generate an RF signal oscillating at the target frequency. Furthermore, FIG. 7 illustrates an oscillator array that includes capacitor arrays that are represented by capacitors 732, 744, 734, and 740. In an example embodiment, capacitors 732 and 734 may represent fine tuning capacitor arrays. Furthermore, capacitors 740 and 740 may represent coarse tuning capacitor arrays. The capacitors 734 and 740 may represent "left" capacitor arrays that are connected to the right end of the FBAR 742. The capacitors 732 and 744 may represent "right" capacitor arrays that are connected to the left end of the FBAR 742.

Returning to FIG. 6, block 602 includes calculating a first frequency drift associated with an oscillator at a current temperature. The current temperature may be measured by the temperature sensor of the beacon 102. Further, the temperature compensation (labelled as "temp comp" in FIG. 7) 702 may calculate a frequency drift of an RF signal that could be generated by the oscillator 204 at the current temperature. As explained elsewhere herein, the BLE transmitter 200 may periodically turn on to transmit a signal. Therefore, the oscillator 204 may generate an RF signal during the period in which the BLE transmitter 200 may be on. Accordingly, the temperature compensation 702 may calculate the frequency drift of the RF signal that could be generated by the oscillator 204 if the oscillator 204 was on.

In an embodiment, the calculated frequency drift may be a quadratic approximation of the frequency drift at the current temperature. The frequency drift may be indicative of the frequency drift due to the effect of temperature on the resonator and the components of the BLE transmitter 200. The quadratic approximation of the frequency drift may be calculated according to the formula (1):

$$f(T) = f(TOT) - \beta(T - TOT)^2 \quad (1)$$

In this approximation, the linear term is a function of the turnover temperature (TOT) of the resonator. T is the current temperature and $\beta$ is the gain coefficient. The turnover temperature may be the temperature at which the oscillator is operable to generate its highest frequency. In an embodiment, TOT 720 and $\beta$ 718 may be received from a register of the processor or from the memory of the beacon 102. Note that TOT 720 and $\beta$ 718 may be predetermined using a calibration technique, described elsewhere herein. Predetermined parameters used in the temperature compensation method 600 may be referred to as "compensation parameters." In an embodiment, and as described below, the compensation parameters used in the method 600 may be determined using a calibration process.

Block 604 based on the calculation, generating a first signal indicative of temperature compensation data. The temp comp 702 may calculate a compensation signal, which may compensate for the effects of the temperature on the performance of the beacon 102. In an example, the compensation signal may depend on the calculated frequency drift. That is, the compensation signal may be calculated such that, when applied to the oscillator 204, the oscillator 204 may generate a frequency within a threshold of the target frequency. For example, the threshold may be a ±5 ppm difference between the frequency that could be generated by the oscillator 204 at the current temperature and the target frequency. In an embodiment, the temperature compensation signal may be calculated according to the formula (2):

$$TC = \frac{-\beta*(D_{temp} - TOT)^2}{2^{26}} \quad (2)$$

$D_{temp}$ 716 may be the current temperature as measured by and received from the temperature sensor. As illustrated in FIG. 7, the temperature compensation signal 758, i.e., the first signal, may be sent to the sum module 704.

Block 606 includes generating a second signal indicative of packet data and a modulation scheme. As explained above, the packet data may be received by the packetizer 202 from the HCI. More specifically, the serializer 712 may receive the packet data 726 from the HCI. The serializer 712 may generate a bitstream that may be indicative of the packet data 726. The process of converting data into a bit stream may be referred to as serialization. As further illustrated in FIG. 7, the whitener 710 may receive the bit stream 754 generated by the serializer 712, may be operable to whiten the bit stream 754. Whitening the bit stream may introduce a pseudorandom element into the bit stream which may improve the balance of 0 bits and the 1 bits of the bit stream.

Subsequently, the GFSK 708 may receive the whitened bit stream 752 from the whitener 710. The GFSK module 708 may filter the bit stream 752 using a Gaussian filter. In an example, the parameters of the Gaussian filter may be set according to a GFSK modulation scheme specified in a Bluetooth or BLE core specification. Parameters according to other specifications may be possible. The multiply module 706 may receive the filtered bit stream 750 from the GFSK module 708.

As illustrated in FIG. 7, the multiply module 706 may also receive a signal "DELTA (Δ)" 724. Δ 724 may be received from a register of the processor or from the memory of the beacon 102. Further, Δ 724 may be a predetermined code indicative of a frequency deviation between the two frequencies of the GFSK modulation scheme. In an embodiment, Δ 724 may be a compensation parameter that is determined using a calibration process. The multiply module 706 may multiply the filtered bit stream 750 by Δ to set the frequency deviation between the frequency associated with the 0 bits and the frequency associated with the 1 bits of the bit stream. For example, the frequency deviation may be 200 ppm. As such, the output signal 756 of the multiply module 706 may be indicative of the modulation scheme and the packet data. In an embodiment, the output 756 of the multiply module 706 may be:

$$\text{Multiply}_{output} = \text{GFSK}_{output} * \Delta \quad (3)$$

Further, in this example, the output 756 may be the second signal of block 608 of FIG. 6.

Block 608 includes using the first signal, the second signal, and a first predetermined signal to generate a first tuning signal. As illustrated in FIG. 7, the sum module 704 may receive the first signal 758 (i.e., the output of the temp comp module 704), the second signal 756 (i.e., the output of the multiply module 706), and a signal 722 labeled as "Offset$_{fine}$." The signal 722 may be a predetermined signal that may be retrieved from a register or memory of the beacon 102. In an embodiment, Offset$_{fine}$ 722 may be a compensation parameter that is determined using a calibration process. Further, the predetermined signal 722 may be indicative of an offset associated with the fine capacitor arrays that are represented by capacitors 732, 734. The sum module 704 may sum the output of the temp comp 702, the output of the multiply module 706, and the predetermined signal 722 to generate a first tuning signal. The first tuning signal may be indicative of the modulation scheme, the packet data, the temperature compensation signal, and the fine capacitor offset associated with the fine capacitor array of the oscillator circuit. In an embodiment, the fine capacitor offset may be predetermined using a calibration technique disclosed herein.

Block 610 includes using the first tuning signal to tune a first capacitor array coupled to the oscillator and a second tuning signal to tune a second capacitor array coupled to the oscillator such that (i) the oscillator generates a modulated RF signal indicative of the packet data and (ii) the modulated RF signal has a second frequency drift that is less than a threshold. For example, the threshold of the frequency drift may be ±5 ppm. Other thresholds may be possible. In an embodiment, the first capacitor array may be a fine capacitor array. As illustrated in FIG. 7, the fine capacitor array may include a right fine capacitor array (represented by capacitor 734) and a left fine capacitor array (represented by capacitor 732). Further, the second capacitor array may be a coarse capacitor array. As illustrated in FIG. 7, the coarse capacitor array may include a right coarse capacitor array (represented by capacitor 740) and a left coarse capacitor array (represented by capacitor 744).

As illustrated in FIG. 7, a predetermined signal 728 (labeled in FIG. 7 as "Offset$_{coarse}$") may be received by the L/R module 714. The predetermined signal 728 may be indicative of a coarse capacitor offset associated with the coarse capacitor array (represented by capacitors 740 and 744). More specifically, the Offset$_{coarse}$ signal 728 may be tune the coarse capacitor arrays such that the frequency of the RF signal generated by the oscillator is near the target frequency. In an embodiment, the Offset$_{coarse}$ may be a compensation parameter that is determined using a calibration process. The L/R module 714 can split the predetermined signal 728 into a right coarse tuning signal 738 and a left coarse tuning signal 746. The right coarse tuning signal 738 may be used to tune the right coarse capacitor array (represented by capacitor 740). Similarly, the left coarse tuning signal may be used to tune the left coarse capacitor array (represented by capacitor 744).

As illustrated in FIG. 7, the output 760 of the sum module 704 may be received by the L/R module 714. The L/R 714 can split the first tuning signal into a right fine tuning signal 736 and a left fine tuning signal 730. The right fine tuning signal 736 may be used to tune the right fine capacitor array. Similarly, the left fine tuning signal 730 may be used to tune the left fine capacitor array. In an embodiment, the first tuning signal 760 may tune the fine tuning capacitor arrays such that the frequency of the RF signal generated by the oscillator is at or within a threshold of the target frequency. For example, the threshold may be a ±5 ppm difference between the generated frequency and the target frequency.

The temperature coefficient of one beacon may differ from the temperature coefficient of a similar beacon. The difference in the temperature coefficient of similar beacons may be a result of process variations that may occur during the manufacturing of the components of the beacons. The process variations may result in measurable differences in the performance of a beacon. In order to account for at least the differences due to process variations, a beacon may be calibrated to accurately determine the compensation parameters for that beacon.

In an embodiment, an off-chip two-point calibration technique may be performed in order to determine the compensation parameters that may be used in a temperature compensation method, such as method 600. The off-chip two-point calibration technique may measure different parameters of the beacon at two different temperatures. For instance, the calibration temperatures may be 10° C. ($T_{10}$) and 50° C. ($T_{50}$). At each temperature, the frequency may be measured, and the on-chip temperature sensor digital value may be recorded. The frequency and the on-chip temperature sensor digital value, at each temperature, may be used to calculate the compensation parameters using an algorithm.

Figure 8:
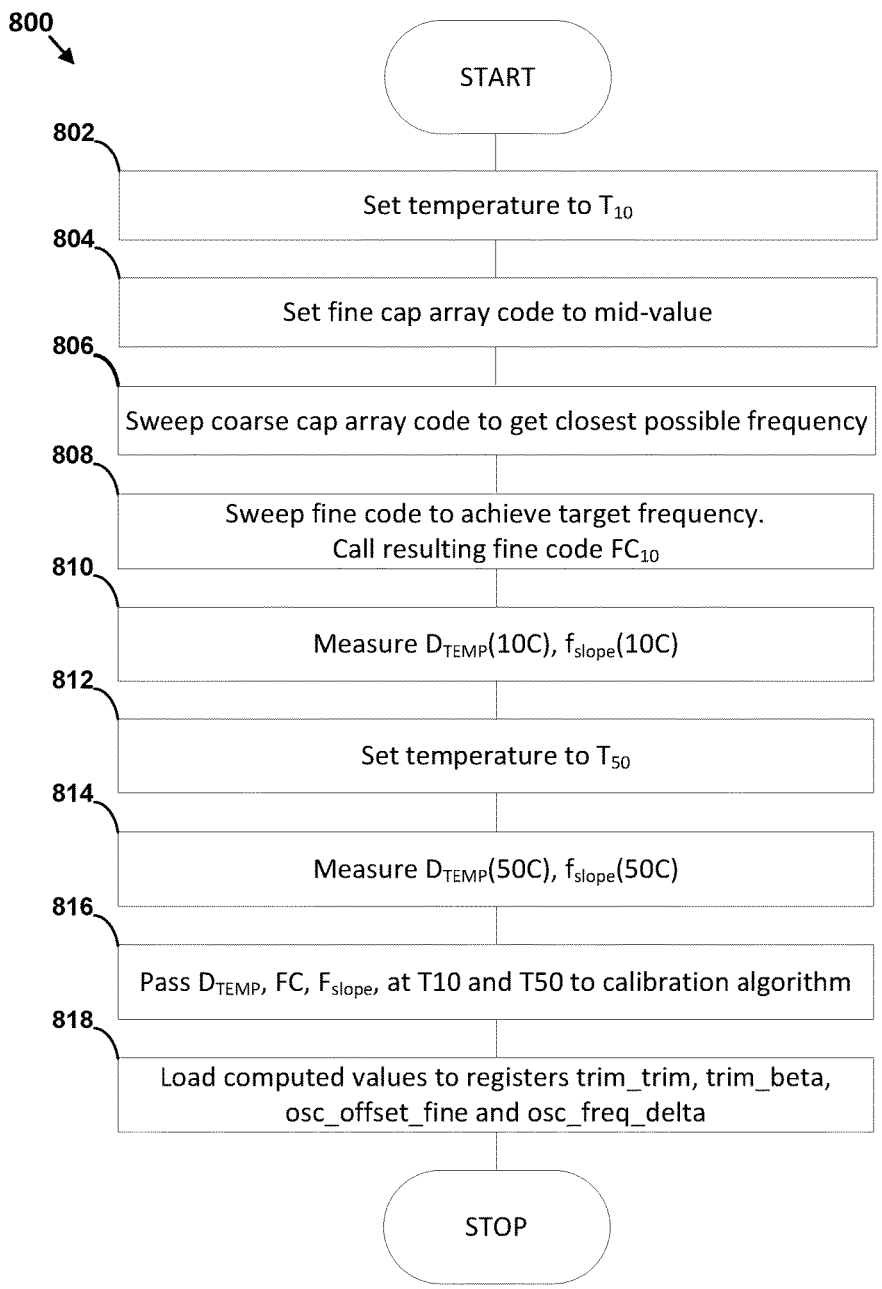
FIG. 8 is a flow diagram of a method, in accordance with an example embodiment.

FIG. 8 illustrates a method 800 of a calibrating a device, according to an exemplary embodiment. For instance, the calibration method 800 may be used to determine the compensation parameters for a device. In particular, the method 800 may be carried out or implemented to calibrate one or more of devices, such as the Bluetooth devices described herein. In an embodiment, one or more testing or calibration equipment may be used to perform the steps of the method 800 to calibrate the one or more beacons.

For example, in order to measure the frequency of an RF signal generated during the calibration process, an off-chip instrument such as a spectrum analyzer, a high-speed oscilloscope, or a high-speed frequency counter may be used. Further, a temperature chamber that can reach the calibration temperatures may be used to change the temperature of the beacon in order to measure parameters of the beacon at the calibration temperatures. For example, the chamber may be a temperature chamber that can reach temperatures of 10° C. ($T_{10}$) and 50° C. ($T_{50}$). In an example, a chamber temperature that may be accurate within 0.25° C. may be used. In such an example, the temperature values that may be used in the calibration algorithm may be $T_{10}$=10° C. and $T_{50}$=50° C.

Alternatively, if the chamber temperature is not accurate within 0.25° C., the calibration setup may provide an auxiliary temperature measurement. That is, the calibration setup may accurately measure the temperature within 0.25° C. In such an example, the temperatures that may be used in the calibration algorithm may be $T_{10}$=$M_{10}$° C. and $T_{50}$=$M_{50}$° C., where $M_{10}$ and $M_{50}$ are the measured chamber temperature. In some examples, a time series measurement of the chamber temperature and of the BLE transmitter's temperature may be used to determine that the temperatures of the chamber and of the BLE transmitter have stabilized.

Further, the method 800 may include one or more steps, processes, and/or functions as illustrated by one or more of blocks 802 through 818. Although the blocks are illustrated in a sequential order, a number of these blocks may also be performed simultaneously and/or in a different order than those illustrated. Also, the various blocks may be combined into fewer blocks, divided into additional blocks, and/or removed based upon specific implementations. Further, a BLE beacon that is calibrated may be connected to a computing device that may be used to provide calibration instructions to the beacon. Also, although the method 800 is described herein as calibrating a BLE beacon, the method 800 may also be carried to calibrate other types of devices.

At step 802, the temperature of the chamber may be set to $T_{10}$. The beacon that is being calibrated may be placed in the temperature chamber. In an embodiment, $T_{10}$ may be 10° C. A time series measurement of the chamber temperature and of the BLE transmitter's temperature may be used to determine that the temperatures of the chamber and of the BLE transmitter have stabilized at or near 10° C.

At step 804, the fine cap array code may be set to its mid-value. The fine cap array code may be indicative of a fine tuning signal that may be applied to the fine tuning capacitor array of the oscillator 204. The fine cap array code set at mid-value may be indicative of a fine tuning signal applied to the fine tuning capacitor array such that the total capacitance of the fine tuning capacitor array is at mid-value of its maximum capacitance.

At step 806, the coarse cap array code is swept such that frequency of the RF signal generated by the oscillator is the closest frequency possible to the target frequency. The coarse cap array code may be indicative of a coarse tuning signal that may be applied to the coarse tuning capacitor array of the oscillator 204. The coarse cap array code may be swept until the frequency of the RF signal generated by the oscillator is the closest frequency possible (using oscillator 204) to the target frequency. The coarse cap array code at which the closest frequency to the target frequency is generated may be stored in the computing device as $Offset_{coarse}$. At step 808, the fine code is swept to achieve the target frequency. The resulting fine code at which the target frequency is generated may be stored in the computing device as $FC_{10}$.

At step 810, the temperature, as measured by the BLE temperature sensor, may be stored as $D_{temp}$ (10° C.). Additionally, the slope ($f_{slope}$) of the FBAR frequency with respect to the fine cap array code (in ppm/code) may be measured and stored, where $f_{slope}=f_2-f_1$. In order to measure the slope, the oscillator fine offset is set to mid-code. Then, the oscillator coarse offset is swept until the output frequency is close to the target frequency. $f_1$ is the FBAR frequency deviation from the target frequency (in ppm) of the frequency measured these offsets. $f_1$ may be measured and stored in the computing device. Subsequently, the fine offset is incremented. $f_2$ is the FBAR frequency deviation from the target frequency (in ppm) after incrementing the oscillator fine offset. $f_2$ is measured and stored in the computing device. Finally, $f_{slope}$ (10° C.) may be calculated using the values of $f_1$ and $f_2$.

At step 812, the temperature is set to $T_{50}$. In an embodiment, $T_{50}$ may be 50° C. A time series measurement of the chamber temperature and of the BLE transmitter's temperature may be used to determine that the temperatures of the chamber and of the BLE transmitter have stabilized at or near 50° C. At step 814, the fine cap array code is swept to achieve the target frequency. The resulting fine code at which the target frequency is generated may be stored as $FC_{50}$. At step 116 the temperature, as measured by the temperature sensor, may be stored as $D_{temp}$ (50° C.). Additionally, $f_{slope}$(50° C.) calculated using $f_1$ and $f_2$, which are measured using the same process described with respect $f_{slope}$(10° C.).

At step 818, the measured parameters may be plugged into the calibration algorithm in order to calculate the compensation parameters. These parameters may then be permanently written to on chip OTP memory. Note that an assumption of the algorithm is that β is known. The assumed β may be stored as $β_{est}$, which is the assumed β for the beacon (in ppb/$C^2$)((parts per billion frequency change) per (degrees Celsius squared)).

In a first step of the algorithm, the temperature offset and gain error of the temperature sensor may be determined. The temperature sensor zero code temperature, $T_{MIN}$ is set to −20° C. The temperature sensor full scale temperature $T_{MAX}$ is set to 80° C. The temperature sensor resolution $n_{tempsense}$ is set to 8 or 9 or 10 bits depending on the mode of the temperature sensor. The ideal slope of the temperature sensor transfer function ($m_{tempsense,ideal}$) is calculated as:

$$m_{tempsense,ideal} = \frac{2^{n_{tempsense}}}{T_{MAX} - T_{MIN}} \quad (4)$$

The ideal temperature sensor code at a temperature T is:

$$D_{temp,ideal}(T) = (T - T_{MIN}) * m_{tempsense,ideal} \quad (5)$$

The temperature sensor gain error is:

$$m_{tempsense} = \text{truncate}\left(\frac{D_{temp,ideal}(50° \text{C.}) - D_{temp,ideal}(10° \text{C.})}{D_{temp}(50° \text{C.}) - D_{temp}(10° \text{C.})}\right) \quad (6)$$

The temperature sensor offset error is:

$$b_{tempsense} = \frac{\begin{array}{c}D_{temp,ideal}(10° \text{C.}) - m_{tempsense} * D_{temp}(10° \text{C.}) + \\ D_{temp,ideal}(50° \text{C.}) - m_{tempsense} * D_{temp}(50° \text{C.})\end{array}}{2} \quad (7)$$

The estimated turnover temperature (TOT) may be determined using the formula:

$$TOT_{est} = \frac{(50° \text{C.} + 10° \text{C.})}{2} + \frac{f_{temp}(10° \text{C.}) - f_{temp}(50° \text{C.})}{2 * 0.001 * \beta_{est} * (10° \text{C.} - 50° \text{C.})} \quad (8)$$

Converting the estimated TOT to digital temperature sensor code:

$$TOT_{dig} = (TOT_{est} - T_{MIN}) * \frac{m_{tempsense,ideal} - b_{tempsense}}{m_{tempsense}} \quad (9)$$

The total gain from the temperature sensor code to frequency ($\beta_{dig}$) may be determined as:

$$\beta_{dig} = \text{round}\left(\frac{(2^{15}(FC_{10} - FC_{50}))}{\left(\frac{(D_{temp}(10° \text{C.}) + D_{temp}(50° \text{C.}) - 2TOT_{dig})}{(D_{temp}(10° \text{C.}) - D_{temp}(50° \text{C.}))}\right)}\right) \quad (10)$$

The frequency offset at TOT may be determined and converted to digital code using:

$$\text{Offset}_{fine} = FC_{10} + \frac{\beta_{dig}(D_{temp}(10 \text{ C.}) - TOT_{dig})^2}{2^{15}} \quad (11)$$

Finally, the digital code required to achieve a frequency deviation of 200 ppm is determined as:

$$\Delta = \frac{400 \text{ ppm}}{f_{slope}(10 \text{ C.}) + f_{slope}(50 \text{ C.})} \quad (12)$$

The calculated compensation parameter $TOT_{dig}$ may be stored as TOT, $\beta_{dig}$ may be stored as β in the memory of the beacon 102. Further, Offset$_{fine}$ and Δ may be stored in the memory of the beacon 102. These parameters may be used in temperature compensation, such as the temperature compensation method 600.

IV. Example Devices

Figure 9:
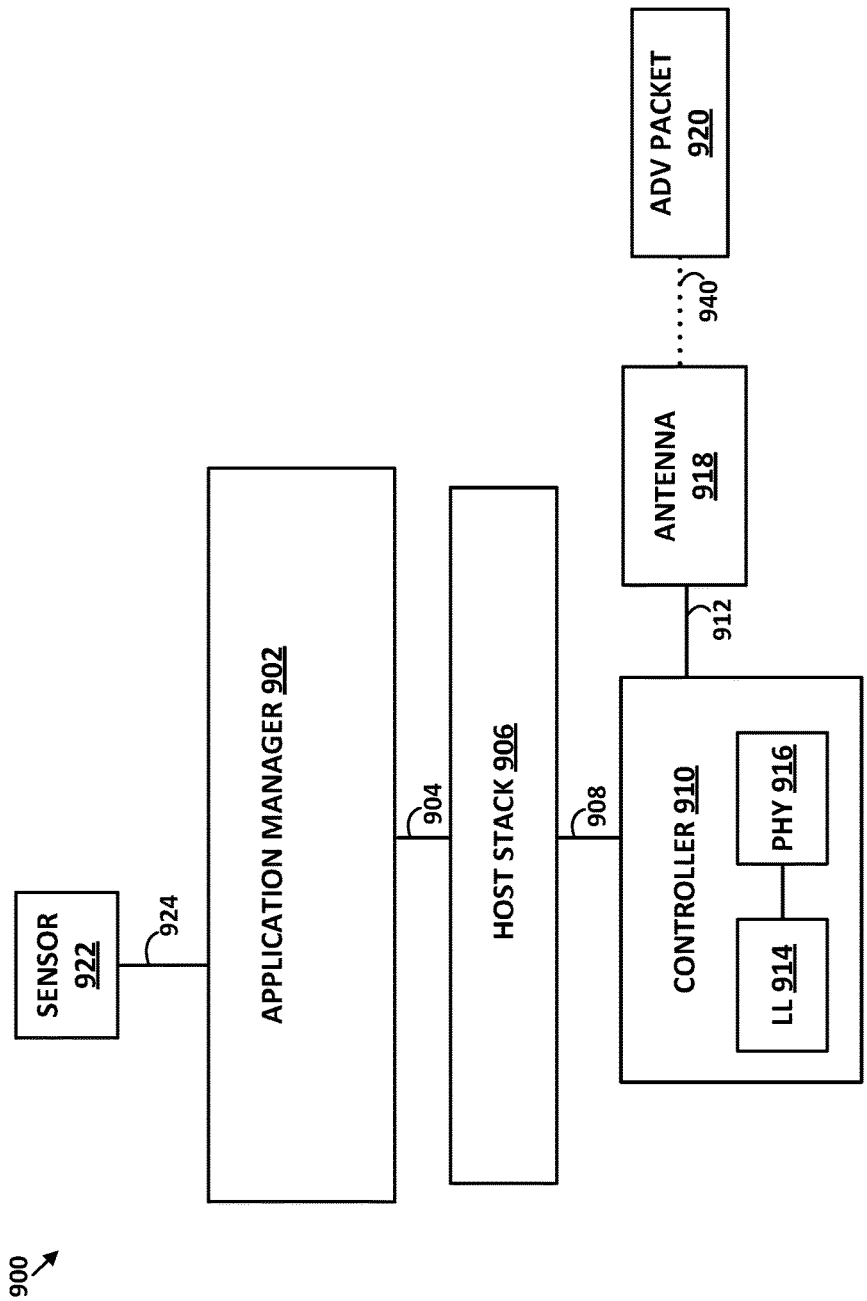
FIG. 9 is a block diagram of a beacon, in accordance with an example embodiment.

As illustrated in FIG. 9, a Bluetooth device 900, such as beacon 102, may include an application manager 902, a host stack 906, a controller 910, an antenna 918, and a sensor 922. In particular, the application manager 902 may be coupled to the host stack 906 by a system bus 904 or a similar mechanism. Further, the host stack 906 may be coupled to the controller 910 by a system bus 908 or a similar mechanism. In some embodiments, the interface between the host stack 906 and the controller 910 may be referred to as HCI. Yet further, the controller 910 may be coupled to the antenna 918 by a system bus 912 or similar mechanism.

In some examples, the application manager 902, host stack 906, and the controller 910 may be implemented on a single IC chip, which may referred to as a "system-on-chip (SOC)." Accordingly, in a SOC implementation, the three layers may be implemented simultaneously on a low power processor. In other examples, the controller 910 may be implemented on a separate processor from the host stack 906. For instance, the controller 910 may be implemented on a low power processor on a device (e.g., a BLE module), while the host stack 906 is implemented on a processor of a host computing device.

As illustrated in FIG. 9, the controller 910 may include a link layer 914 (LL) and a physical controller interface 916 (PHY). The link layer 914, which may manage the configuration of the Bluetooth device, may directly interact with the physical controller interface 916, which may include the hardware for generating a signal. The link layer 914, on the other hand, may be implemented using a combination of hardware and software. Accordingly, the physical controller interface 916 and link layer 914 may be implemented in Bluetooth device 900 using at least the BLE transmitter 200. The physical controller interface 916 and link layer 914 may also be implemented using a BLE transceiver, which may include the BLE transmitter 200.

Accordingly, in examples where the physical controller interface 916 may be implemented using at least the BLE transmitter 200, the Bluetooth device 900 may operate in an advertising mode. More specifically, the Bluetooth device 900 may broadcast advertising packets on one of the BLE advertising channels. The specific channel onto which the advertising packet may be advertised may depend on the configuration of the BLE transmitter 200. Further, the broadcast advertising packets may be scannable and undirected advertising packets. Yet further, the Bluetooth device 900 may broadcast packets that may be part of a broadcast event.

Figure 10:
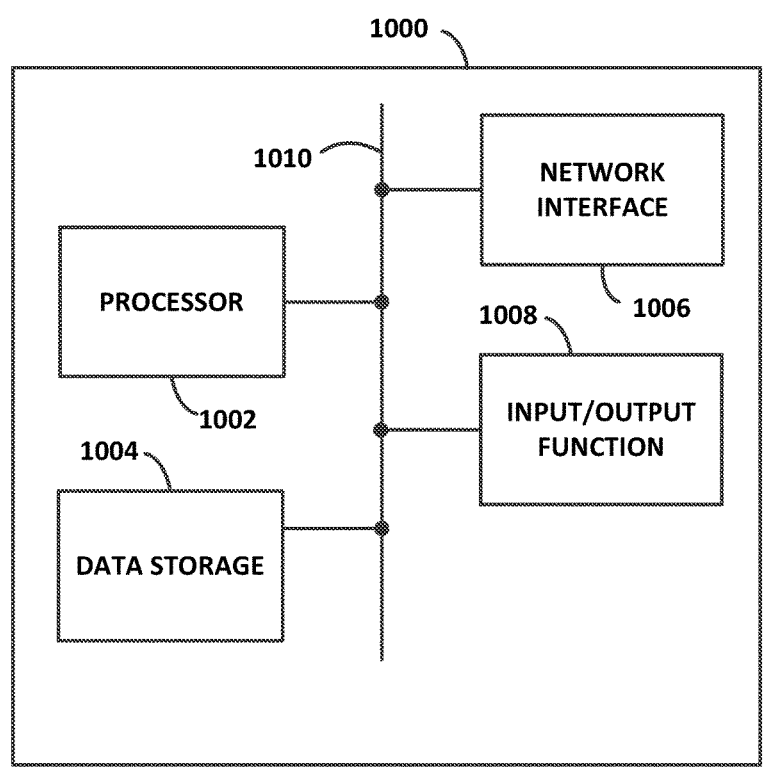
FIG. 10 is a block diagram of a computing device, in accordance with an example embodiment.

In some embodiments, the Bluetooth device 900 may be in advertising mode to broadcast an advertising packet 920 to one or more computing devices. FIG. 10 is a block diagram of an example computing device 1000. In some instances, computing device 1000 may, for example, take the form of any computing device described above in relation to FIG. 1 or a similar device that may be configured to perform the methods and functions described herein. In this example, computing device 1000 includes a processor 1002, data storage 1004, a network interface 1006, and an input/output function 1008, all of which may be coupled by a system bus 1010 or a similar mechanism. Processor 1002 can include one or more CPUs, such as one or more general purpose processors and/or one or more dedicated processors (e.g., application specific integrated circuits, digital signal processors, network processors, application processing unit, etc.).

Data storage 1004, in turn, may comprise volatile and/or non-volatile data storage and can be integrated in whole or in part with processor 1002. Data storage 1004 can hold program instructions, executable by processor 1002, and data that may be manipulated by these instructions to carry out the various methods, processes, or functions described herein. Alternatively, these methods, processes, or functions can be defined by hardware, firmware, and/or any combination of hardware, firmware, and software. By way of example, the data in data storage 1004 may contain program instructions, perhaps stored on a non-transitory, computer-readable medium, executable by processor 1002 to carry out any of the methods, processes, or functions disclosed in this specification or the accompanying drawings.

Network interface 1006 may take the form of a wireless connection, such as Bluetooth. In particular, network interface 1006 may enable one or more Bluetooth standards or protocols, including BLE protocols and related advertising protocols. For example, referring back to FIG. 1, computing device 106 may also include network interface 1006 to pair with computing device 108. In addition, the network interface 1006 may include a transceiver. A transmitter can transmit radio waves carrying data and a receiver can receive radio waves carrying data. A transceiver with that transmitter and receiver can include one or more antennas and can be referred to as a "radio unit," an "RF transceiver," or a "wireless transceiver." In addition, network interface 1006 may take the form of other wireless connections, such as IEEE 802.11 (Wi-Fi), or a wide-area wireless connection. However, other forms of physical layer connections and other types of standard or proprietary communication protocols may be used over network interface 1006. Furthermore, network interface 1006 may comprise multiple physical interfaces. Further, network interface 1006 may take the form of a wireline connection, such as an Ethernet connection.

Input/output function 1008 may facilitate user interaction with example computing device 1000. Input/output function 1008 may comprise multiple types of input devices, such as a keyboard, a mouse, a touch screen, and so on. Similarly, input/output function 1008 may comprise multiple types of output devices, such as a screen, monitor, printer, or one or more light emitting diodes (LEDs). Additionally or alternatively, example computing device 1000 may support remote access from another device, via network interface 1006 or via another interface (not shown), such as a universal serial bus (USB) or high-definition multimedia interface (HDMI) port.

In some embodiments, the computing device 1000 may include a device platform or operating system (not shown). In some instances, the device platform or the operating system may be compatible with Bluetooth, Bluetooth Low Energy (BLE) protocols, and/or BLE advertising protocols. In some instances, the device platform or the operating system may be configured as a multi-layered Linux platform or operating system. The device platform may include different applications and an application framework, as well as various kernels, libraries, and runtime entities. In other examples, other formats or systems may operate the computing device 1000 as well.

Accordingly, Bluetooth device 900 may transmit advertising packet 920 which may be received by computing device 1000. In particular, an application may be downloaded on Bluetooth device 900 or on a computing device combined with Bluetooth device 900. Further, the application may exchange advertisement data with application manager 902 through an application interface. Yet further, the applications may communicate with application manager 902 to transmit the advertisement packet 920 to other devices (not shown in FIG. 9), such as computing device 1000.

In some embodiments, Bluetooth device 900 may enter advertisement mode to transmit an advertising packet over the air for one or more applications. In some examples, the application of the Bluetooth device 900 may be predetermined. For instance, the Bluetooth device 900 may be a location beacon. In an example, the Bluetooth beacon 900 may be located inside of a building (e.g., an office building, store, etc.). Further, a computing device 1000 may be located in proximity to the Bluetooth beacon 900. When the Bluetooth beacon 900 transmits advertising packets, it may transmit the advertising packet with location data. Depending on the specific embodiment, the location data can take many different forms. For example, the Bluetooth beacon 900 may be configured to provide data related to a location of the respective Bluetooth beacon either via relative position information or geographic coordinate system data. In another example, the Bluetooth beacon 900 may provide the computing device 1000 with global location data.

These reference advertisement packets may correspond to a location that is known by the computing device 1000, such as the entrance to a building. In other embodiments, the computing device 1000 may receive data wirelessly including a set of reference advertisement packets. For example, when entering a building, the Bluetooth beacon 900 may communicate a set of data that relates to reference advertisement packets that the computing device 1000 can expect to receive when stepping foot inside the store.

In another example, the Bluetooth device 900 may include a sensor 922. As illustrated, the sensor 922 may exchange data with the application manager 902 through the application interface 924. For instance, the Bluetooth device 900 may broadcast advertising packets, which may include data collected by the sensor 922, which the application manager 902 may receive through the application interface 924. For instance, the Bluetooth device 900 may be a body-mountable device configured to be mounted to a skin surface (e.g., to skin of the upper arm or abdomen of a person), with one or more sensors for quantitatively and qualitatively testing an analyte concentration in interstitial fluid (e.g., glucose in interstitial fluid) in situ and in real-time. Those of skill in the art will recognize that the sensing platform described herein may be provided in devices that could be mounted on a variety of portions of the human body to measure concentrations of an analyte in other fluids than interstitial fluid (e.g., to measure an analyte in a tear fluid, blood, saliva, or some other fluid or tissue of the body). Accordingly, the Bluetooth device 900 may be used for monitoring or detecting a user's health state. Further, the Bluetooth device 900 may broadcast sensor readings to a user's computing device 1000.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
calculating a first frequency drift associated with an oscillator at a current temperature;
based on the calculation, generating a first signal indicative of temperature compensation data;
generating a second signal indicative of packet data and a modulation scheme
using the first signal, the second signal, and a first predetermined signal to generate a first tuning signal; and
using the first tuning signal to tune a first capacitor array coupled to the oscillator and a second tuning signal to tune a second capacitor array coupled to the oscillator such that (i) the oscillator generates a modulated RF signal indicative of the packet data and (ii) the modulated RF signal has a second frequency drift that is less than a threshold.

2. The method of claim 1, wherein the oscillator is a Pierce oscillator comprising a thin-film bulk acoustic resonator (FBAR).

3. The method of claim 1, wherein the first frequency drift is calculated based on the current temperature, a turnover temperature, and a gain coefficient.

4. The method of claim 3, wherein the first capacitor array comprises a first and a second fine tuning capacitor array, and wherein the second capacitor array comprises a first and a second coarse tuning capacitor array.

5. The method of claim 4, wherein the first tuning signal comprises a first fine tuning signal, and a second fine tuning signal, wherein the second tuning signal comprises a first coarse tuning signal and a second coarse tuning signal, and wherein using the first tuning signal to tune a first capacitor array coupled to the oscillator and a second tuning signal to tune a second capacitor array coupled to the oscillator comprises:
tuning the first coarse capacitor array and the second coarse capacitor array with the first coarse tuning signal and the second coarse tuning signal respectively; and
tuning the first fine capacitor array and the second fine capacitor array with the first fine tuning signal and the second fine tuning signal respectively.

6. The method of claim 5, wherein the first predetermined signal is indicative of a fine tuning offset associated with the first and the second fine capacitor arrays.

7. The method of claim 6, wherein the second tuning signal is indicative of a coarse tuning offset associated with the first and the second coarse capacitor arrays.

8. The method of claim 7, wherein the modulation scheme is Gaussian Frequency Shift Keying (GFSK).

9. The method of claim 8, wherein generating the second signal indicative of the packet data and the modulation scheme comprises:
generating a serialized data stream based on the packet data;
whitening the serialized data stream;
filtering the whitened data stream using a Gaussian filter;
multiplying the filtered data stream by a second predetermined signal to generate the second signal, wherein the second predetermined signal is indicative of a frequency deviation of the modulation scheme.

10. The method of claim 9, wherein the first and the second predetermined signals, the second tuning signal, the turnover temperature, and the gain coefficient are predetermined using an off-chip two-point calibration process.

11. The method of claim 1, wherein the modulated RF signal comprises advertising packets.

12. A broadcasting unit comprising:
an oscillator;
a first capacitor array and a second capacitor array coupled to the oscillator;
a temperature sensor;

a controller comprising a processor programmed to:
   calculate a first frequency drift associated with the oscillator at a current temperature;
   based on the calculation, generate a first signal indicative of temperature compensation data;
   generate a second signal indicative of packet data and a modulation scheme;
   use the first signal, the second signal, and a first predetermined signal to generate a first tuning signal; and
   use the first tuning signal to tune the first capacitor array and a second tuning signal to tune the second capacitor array such that (i) the oscillator generates a modulated RF signal indicative of the packet data and (ii) the modulated RF signal has a second frequency drift that is less than a threshold.

13. The broadcasting unit of claim 12, wherein the first capacitor array comprises a first and a second fine tuning capacitor array, and wherein the second capacitor array comprises a first and a second coarse tuning capacitor array.

14. The broadcasting unit of claim 13, wherein the first tuning signal comprises a first fine tuning signal and a second fine tuning signal, wherein the second tuning signal comprises a first coarse tuning signal and a second coarse tuning signal, and wherein the processor is programmed to:
   tune the first coarse capacitor array and the second coarse capacitor array with the first coarse tuning signal and the second coarse tuning signal respectively; and
   tune the first fine capacitor array and the second fine capacitor array with the first fine tuning signal and the second fine tuning signal respectively.

15. The broadcasting unit of claim 14, wherein the first predetermined signal and the second tuning signal are predetermined using an off-chip two-point calibration process.

16. A system comprising:
   a sensor;
   a transceiver coupled to the sensor, the transceiver comprising:
   an oscillator comprising a thin-film bulk acoustic resonator (FBAR);
   a first capacitor array and a second capacitor array coupled to the oscillator;
   a temperature sensor; and
   an antenna;
   a controller comprising a processor programmed to:
   calculate a first frequency drift associated with the oscillator at a current temperature;
   based on the calculation, generate a first signal indicative of temperature compensation data;
   generate a second signal indicative of packet data and a modulation scheme;
   use the first signal, the second signal, and a first predetermined signal to generate a first tuning signal; and
   use the first tuning signal to tune the first capacitor array and a second tuning signal to tune the second capacitor array such that (i) the oscillator generates a modulated RF signal indicative of the packet data and (ii) the modulated RF signal has a second frequency drift that is less than a threshold.

17. The system of claim 16, wherein the first capacitor array comprises a first and a second fine tuning capacitor array, and wherein the second capacitor array comprises a first and a second coarse tuning capacitor array.

18. The system of claim 17, wherein the first tuning signal comprises a first fine tuning signal and a second fine tuning signal, wherein the second tuning signal comprises a first coarse tuning signal and a second coarse tuning signal, and wherein the processor is programmed to:
   tune the first coarse capacitor array and the second coarse capacitor array with the first coarse tuning signal and the second coarse tuning signal respectively; and
   tune the first fine capacitor array and the second fine capacitor array with the first fine tuning signal and the second fine tuning signal respectively.

19. The system of claim 16, wherein the packet data is based on an output of the sensor.

20. The system of claim 16, wherein the modulation scheme is Gaussian Frequency Shift Keying (GFSK).

* * * * *